(12) United States Patent
Arecco et al.

(10) Patent No.: US 7,072,580 B2
(45) Date of Patent: *Jul. 4, 2006

(54) AUTOPROTECTED OPTICAL COMMUNICATION RING NETWORK

(75) Inventors: Fulvio Arecco, Monza (IT); Valerio Viscardi, Paderno Dugnano (IT); Aldo Aprile, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 390 days.

This patent is subject to a terminal disclaimer.

(21) Appl. No.: 09/750,311

(22) Filed: Dec. 29, 2000

(65) Prior Publication Data

US 2002/0003639 A1    Jan. 10, 2002

(30) Foreign Application Priority Data

May 31, 2000    (EP)    .................................. 00111594

(51) Int. Cl.
- H04J 14/02    (2006.01)
- H04B 10/08    (2006.01)
- H04B 10/14    (2006.01)
- H04B 10/24    (2006.01)

(52) U.S. Cl. ..................... 398/4; 398/3; 398/7; 398/20; 398/50; 398/59; 398/79; 398/63

(58) Field of Classification Search ................ 359/117, 359/128, 110, 119, 124, 133; 385/16, 17, 385/24; 370/223, 224, 227, 228, 222, 242, 370/541; 398/79; 340/506; 348/5; 714/4
See application file for complete search history.

(56) References Cited

U.S. PATENT DOCUMENTS

| | | | |
|---|---|---|---|
| 5,647,035 A | * | 7/1997 | Cadeddu et al. ............... 385/24 |
| 5,751,454 A | | 5/1998 | MacDonald et al. .......... 398/59 |
| 5,777,761 A | | 7/1998 | Fee ............................... 398/7 |

(Continued)

FOREIGN PATENT DOCUMENTS

EP    920153 A2 *    6/1999

OTHER PUBLICATIONS

Karasan, E. and E. Goldstein, "Optical restoration at the wavelength-multiplex section level in WDM mesh networks." IEEE Photonics Technology Letters. vol. 10, No. 9, Sep. 1998: 1343-1345.*

Fang, X. et al. "All-optical four-fiber bidirectional line-switched ring." Journal of Lightwave Technology. vol. 17, No. 8, Aug. 1999: 1302-1308.*

(Continued)

Primary Examiner—M. R. Sedighian
Assistant Examiner—David S. Kim
(74) Attorney, Agent, or Firm—Baker Botts L.L.P.

(57) ABSTRACT

An autoprotected optical communication ring network includes a first and a second optical carrier having opposite transmission directions and a plurality of optically reconfigurable nodes optically connected along the first and the second optical carrier and adapted to communicate in pairs on links susceptible to failure, the ring network having a normal operative condition in which the nodes of each pair are optically configured so as to exchange optical signals on a working arc path at a respective first wavelength ($\lambda_x$) on the first carrier and at a respective second wavelength ($\lambda_y$) different from the first wavelength ($\lambda_x$) on the second carrier, the working path having a complementary arc path defining a protection arc path in which the first wavelength ($\lambda_x$) on the first carrier and the second wavelength ($\lambda_y$) on the second carrier can be used for further links.

11 Claims, 18 Drawing Sheets

U.S. PATENT DOCUMENTS

| | | | |
|---|---|---|---|
| 5,886,801 A | 3/1999 | Van Deventer | 398/59 |
| 6,005,694 A | 12/1999 | Liu | 398/6 |
| 6,046,832 A | 4/2000 | Fishman | 398/45 |
| 6,222,653 B1 | 4/2001 | Asahi | 398/4 |
| 6,246,667 B1 * | 6/2001 | Ballintine et al. | 370/224 |
| 6,259,837 B1 * | 7/2001 | de Boer et al. | 385/24 |
| 6,331,906 B1 * | 12/2001 | Sharma et al. | 398/48 |
| 6,400,476 B1 * | 6/2002 | Arecco | 398/9 |

OTHER PUBLICATIONS

Gerstel, O. and R. Ramaswami. "Optical layer survivability: a services perspective." IEEE Communications Magazine. Mar. 2000: 104-113.*

Ramaswami, R. and K.N. Sivarajan. Optical Networks: A Practical Perspective. San Francisco, California: Morgan Kaufmann Publishers, Inc., 1998.*

* cited by examiner

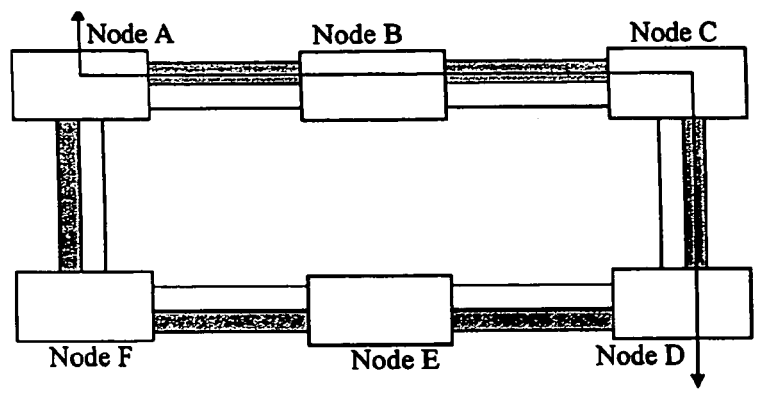
Fig. 1a
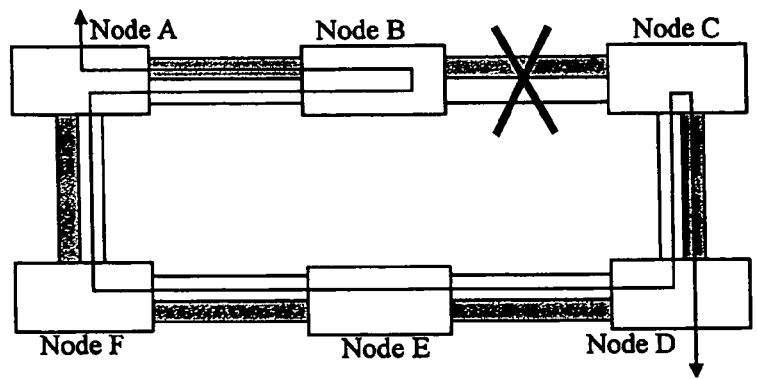
Fig. 1b
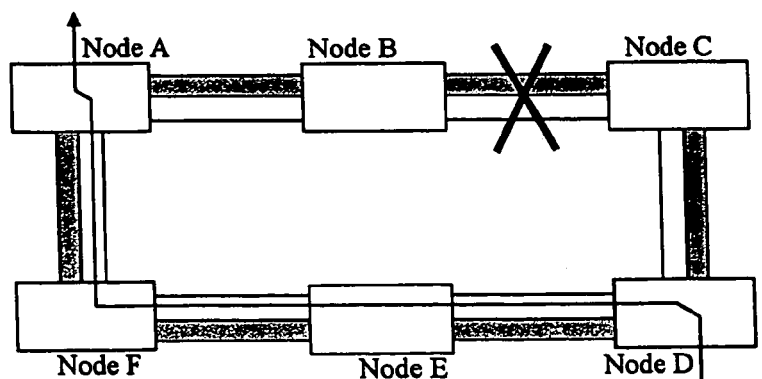
Fig. 1c
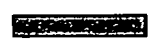 Working
 Protection
 Transmission link

US 7,072,580 B2

AUTOPROTECTED OPTICAL COMMUNICATION RING NETWORK

CROSS-REFERENCE TO RELATED APPLICATIONS

This application is related to and claims benefit of priority to European Patent Application No. 01-11594.8, filed 31 May 2000, is incorporated herein by reference.

Technical Field of the Invention

The present invention relates to an autoprotected optical communication ring network, in particular a WDM (Wavelength Division Multiplexing) autoprotected optical communication ring network of the type including a plurality of nodes connected to each other in pairs by means of respective optical connections susceptible to failure, each connection comprising at least a first and a second optical carrier having opposite transmission directions.

BACKGROUND OF THE INVENTION

"Optical communication ring network" here means not only a communication network configured as a whole as a ring but, in general, any section of a network comprising a plurality of nodes and branches and arranged, at least temporarily, in a ring configuration.

Specifically, the present invention tackles the problem of making a ring network with self-healing capabilities, i.e. capabilities of managing failures which may arise in the connections between the network nodes.

"Failure" here means any event which may affect the physical optical carriers (e.g. breakage or interruption of an optical fiber) and/or the devices of the network operating on the transmitted signals (e.g. receivers; demultiplexers, amplifiers, etc.), in such a way as to bring about a situation of degradation of the transmission which is deemed not tolerable; the term "failure" thus should in no way be interpreted as being limited only to events causing the complete interruption of the connection.

The state of the art includes many methods to optically protect a set of wavelength multiplexed optical channels carried by a two-fiber optical ring network.

European Patent Application No. 769859 in the name of the Applicant relates to a transparent optical self-healing-ring communication network in which at least two nodes are optically connected along a first and a second closed optical path having opposite transmission directions. Each node simultaneously feeds its transmitted signals to the first and the second closed optical path, so that the signals travel along complementary arcs of the ring. The receiving node selectively receives the signals from one of the two closed paths and, in case of failure on this closed path, switches reception on the other closed path. The Applicant observes that this Optical Channel Protection method, identifiable as a "Optical Channel 1+1 Dedicated Ring Protection" method, requires that, for each wavelength used on one closed path, the same wavelength cannot be used on the other closed path other than for protection. Thus, with N wavelengths, only N protected channels can be used in the network.

European Patent Application No. 97123013.1-2209 filed on Dec. 31, 1997 in the name of the Applicant relates to a method and an apparatus for transparent optical communication with two-fiber bidirectional ring with autoprotection and management of low priority traffic. The communication network comprises two optical fibers (an external one and an internal one) that interconnect the nodes. According to the proposed technique, if a first and a second node of the network are considered for mutual signal transmission, a high-priority traffic can be set up on a first bidirectional communication path defined between the two nodes on the external and internal fibers, using only an arc of the communication ring defined between the two nodes.

The arc complementary to that just described can be used as a second bidirectional communication path between the two nodes for low-priority traffic, using the same wavelength as the preceding channel. The protection mechanism consists of redirecting the high-priority traffic onto the second path in the case of a breakdown in, or degradation of, communication on the first path, thus losing the low-priority traffic on the second path. This protection method is identifiable as a "Optical Channel 1:1 Dedicated Ring Protection" method with management of Low-Priority traffic. The Applicant observes that; although this method provides a double capacity with respect to the previous technique, with N wavelengths it is still not possible to protect more than N channels.

The article "A Transparent, All-Optical, Metropolitan Network Experiment in a Field Environment: The "PROMETEO" Self-Healing Ring", F. Arecco et al., IEEE Journal of Lightwave Technology, Vol. 5, December 1997, describes a method to provide protection against failures in a metropolitan ring network. According to this method, a working fiber ring is used to carry all the optical channels between nodes, while a protection fiber ring is empty under normal operating conditions. In case of failure, a protection switching takes place at the nodes adjacent to the failure, which reconfigure in such a way to route all the optical channels (i.e. all the wavelengths of the multiplex section) through the protection fiber ring so as to bypass the failure. This protection method is known as "Optical Multiplex Section Protection" method. The Applicant observes that, once more, with N wavelengths it is possible to carry only N protected channels. Moreover, the Applicant further observes that, in this case, it is not possible to have different protection mechanisms (i.e. protection at different layers) for different channels, and that the optical path after a protection reconfiguration can be longer than the ring circumference.

U.S. Pat. No. 5,647,035 in the name of CSELT—Centro Studi e Laboratori Telecomunicazioni S.p.A.—provides a ring network communication structure on an optical carrier and a reconfigurable node for said structure. In said structure, a plurality of nodes are interconnected by means of connections comprising at least a first and a second optical carrier, such as an optical fiber. Transmission between two nodes occurs on the ring according to a WDM scheme, by utilizing a first wavelength for communication in one direction on the first carrier and a second wavelength for communication in the opposite direction on the second carrier. The second wavelength on the first carrier and the first wavelength on the second carrier are reserved for protection (protection channels) and are "shared" among all the nodes. Under regular operation conditions of the network, in each node the signals conveyed by the two fibers are detected, processed as required in units of a higher hierarchical level, converted again in optical signals and re-transmitted towards the following node. In the presence of a failure on one of the connections, the nodes adjacent to the failed connection reconfigure themselves to ensure the continuation of communication on the alternative path provided by the ring, by utilizing the first wavelength on the second carrier and the second wavelength on the first carrier. The exemplary embodiment described referring to just two wavelengths $\lambda_1,\lambda_2$, can be generalized to any number of wavelengths with a corresponding expansion of the described connection; switching matrices of the n×n type may be used.

The Applicant noticed that, in the ring network proposed in U.S. Pat. No. 5,647,035, if multi-wavelength signals have to be managed, since signal re-routing is localized at the nodes adjacent to the failure, the protection operations have to be performed on the entire set of wavelengths of the multiplex section (as described for SDH in ITU-T Recommendation G-803 and G-841) and the reconfigured nodes must re-route all the working channels previously sent on the damaged ring segment to their respective protection channels running onto the complementary ring arc. This technique is then identifiable as an "Optical Multiplex Section Shared Protection" technique. Thence, each node in the network must be equipped with the optical switching tools for the complete set of wavelengths in the ring, and a switch matrix is then needed with a complexity which increases considerably with increasing the number of channels (e.g. if each channel carries 2.5 Gb/s and the system is adapted to transmit 16 channels, each matrix must be able to switch 16×2.5 Gb/s). It can be demonstrated that, in this case, the required optical switching blocks to protect a number of links between N and MN/2 (where N is the number of wavelengths and M the number of nodes) is always MN.

Furthermore, the Applicant observes that, in the Optical Multiplex Section Shared Protection, since the failure control is performed at the multiplex section level, a failure on a single optical channel (e.g. when a node transmitter is damaged) can be either ignored or it can cause the reconfiguration of all the traffic thus causing a temporary failure on all the other working channels.

The Applicant further observes that, in case such a network is reconfigured as a consequence of a failure, the protection path of a generic optical channel may be longer than the maximum ring circumference. This can occur when a generic bidirectional link is set up between two non-adjacent nodes in the network, as illustrated in FIG. 1a (where nodes A and D are involved). In case of failure the switching action is performed by the two nodes adjacent to the failure (i.e. nodes B and C), as shown in FIG. 1b. Briefly, each channel of the bidirectional link travels along the working path from the source node to one of the reconfigured nodes where it is routed into the protection path. Then it travels in opposite direction along all the ring network to the other reconfigured node where it is routed again on the working path and, finally, it reaches the destination node. This alternative optical channel path may have a length exceeding the ring circumference, reaching values of several hundred kilometers and then introducing low levels of S/N ratio and high levels of attenuation. In case of a transoceanic application, this protection solution may lead, due to loopbacks, to restoration transmission paths that would cross the ocean three times.

To overcome this last problem, a different protection solution has been proposed, which is referred to as a "MS shared protection ring—transoceanic application" in the Annex A of the Telecommunication standard ITU-T Recommendation G.841. In brief, a failure is detected at the two nodes adjacent to the failure at the SDH multiplex section layer and, subsequently, the nodes terminating failed links are informed of the failure situation and re-route the corresponding links on the complementary ring arc path, as illustrated in FIG. 1c. In other words, in case of failure, all the transmission links affected by the failure are bridged at their source nodes onto the protection channels that travels away from the failure. When the affected links reach their final destination nodes, they are switched to their original drop point. Therefore, no loopbacks are established and there is no risk of having, in case of failure, restoration transmission paths crossing more times the ocean.

The Applicant observed that, in this case, as in the protection solution of U.S. Pat. No. 5,647,035, the failure control is over the entire optical multiplex section and, therefore, a failure on a single optical channel may be either ignored or it can cause the reconfiguration of all the traffic thus causing a temporary failure on all the other working channels.

The Applicant further observes that a protection at the SDH layer requires a relatively complex electronic layout and can operate only at a predetermined bit rate.

SUMMARY OF THE INVENTION

The Applicant proposes, with the present invention, an improved type of shared protection technique, in which re-routing operations are performed only at the nodes which terminate affected links and only on the failed channels, thus avoiding the drawbacks related, to re-routing operations on the multiplex section, and by using an optical reconfigurable connection mechanism which allows the omission of a SDH layer protection mechanism. Moreover, the failure control is performed at the channel level instead of at the multiplex section level, thus avoiding the above mentioned drawbacks.

In the proposed network, the nodes communicate in pairs defining bidirectional links, and, under normal conditions, are optically configured so as to exchange signals on a respective working arc path at a respective first wavelength on a first carrier of the network and at a respective second wavelength on a second carrier of the network; in the complementary arc, the same wavelengths may be used in the same manner to define other links, while the first wavelength on the second carrier and the second wavelength on the first carrier are reserved for protection and are used in case of failure affecting one of said links. Each node of the proposed network is provided with a pair of OADM (Optical Add/Drop Multiplexers) for extracting from, and inserting in, the optical multiplex section, only the channels which the node is adapted to operate on. All the remaining channels are passed-through. Each node is further provided with a receiving/transmitting module for each pair of wavelengths defining a transmission link, said module optically connecting, in a selective way, the OADMs to optical transmitters and receivers operating at said wavelengths. Each receiving/transmitting module performs failure control and re-routing operations on the two corresponding wavelengths. Consequently, in case of failure, if one of the links managed by this node is failed, the corresponding receiving/transmitting module, after detecting the failure by checking the channels status, is reconfigured in order to optically re-route the transmission on the complementary portion of the ring. The same operation is performed by the node at the other end of the failed link. Therefore, only the nodes managing affected links are optically reconfigured and only the failed channels (instead of the global multiplex section) are re-routed.

The protection technique of the invention provides the following advantages:

By operating protection at the channel level, it is possible to provide optical protection to a selected subset of optical channels and leave to other layers (e.g. SDH) or to other optical protection mechanisms the protection of the remaining channels.

Using an optical re-routing technique, it is possible to omit the SDH protection layer, thus simplifying the node structure and allowing a direct connection to the ring network for clients using different protocols (possibly unprotected) like ATM, IP, etc. The proposed protection technique is therefore compatible with every client electronic transmission protocol.

The receiving/transmitting module in the protection scheme of the invention includes an optical switching unit which, differently from SDH switching layouts, can operate at different bit rates (for example 155 Mbit/s, 622 Mbit/s, 2.5 Gbit/s, 10 Gbit/s)

The protection technique of the invention allows a client to client protection, since a failure is detectable even if it affects a single channel, while generally the prior art techniques allow only global failure detection on the multiplexed flux (by using threshold photodiodes).

The number of switching blocks is always two times the number of protected channels (i.e. between 2N and MN, where N is the number of wavelengths and M the number of nodes) thus giving an advantage, with mixed traffic patterns, over the Optical Multiplex Section Shared Protection schema proposed in U.S. Pat. No. 5,647,035. For example, with a typical 8 nodes, 32 wavelengths optical ring network (M=8, N=32), the required number of switching blocks for said Optical Multiplex Section Shared Protection schema is always 256, while by using the Optical Channel Shared Protection schema of the invention the required number of switching blocks varies between 64 (in case of "hub traffic", i.e. one node communicating with all the other nodes) and 256 (in case of "uniform traffic", i.e. one node communicating only with its two adjacent nodes).

Since the reconfiguration takes place at the channel level instead of at the multiplex section level as in U.S. Pat. No. 5,647,035, it is no more needed to provide each node with a switching equipment to perform protection on all the network channels (in particular it is then not necessary to use complex switch matrix as in the Optical Multiplex Section Shared Protection scheme).

Differently from the Optical Multiplex Section Shared Protection scheme proposed in U.S. Pat. No. 5,647,035, the complexity of the node switching structure depends only on the number of links managed by the nodes and does not depend on the number of wavelengths in the network.

Differently from the Optical Multiplex Section Shared Protection scheme proposed in U.S. Pat. No. 5,647,035, switching operations are performed externally to the network, and then no transitories are present. In particular, switching of the single channel is performed, as described below, between the receiving and the transmitting transponders and, therefore, the multiplexed optical flux conditions at the input of the node amplifier are substantially unchanged and then sudden power variations inside the network are avoided.

According to a first aspect, the present invention relates to an autoprotected optical communication ring network, including a first and a second optical carrier having opposite transmission directions and a plurality of optically reconfigurable nodes optically connected along the first and the second optical carrier and adapted to communicate in pairs by means of respective links susceptible of failure, the ring network having a normal operative condition in which the nodes of each pair are optically configured so as to exchange optical signals on a respective working arc path at a respective first wavelength on the first carrier and at a respective second wavelength different from said first wavelength on the second carrier, said respective working path having a complementary arc path defining a respective protection arc path in which the first wavelength on the first carrier and the second wavelength on the second carrier can be used for further links and the first wavelength on the second carrier and the second wavelength on the first carrier are reserved for protection, wherein the ring network has a failure operative condition in which the nodes terminating a failed link are optically reconfigured so as to exchange optical signals on the respective protection arc path at the respective second wavelength on the first carrier and at the respective first wavelength on the second carrier.

Preferably, each of said plurality of reconfigurable nodes is adapted to manage a predetermined subset of wavelengths within a set of transmission wavelengths and includes a first and a second optical add/drop multiplexer serially connected to said first and, respectively, second carrier to feed/extract said subset of wavelengths to/from said first and, respectively, second carrier, and to pass-through the remaining wavelengths of the set of transmission wavelengths.

Each of said plurality of reconfigurable nodes preferably includes at least a signal input, at least a signal output and a reconfigurable optical switch unit selectively coupling said at least an signal input and said at least a signal output to said first and second carriers.

Said at least a signal input may be optically coupled to a respective optical transmitter and said at least a signal output may be optically coupled to a respective optical receiver.

Each of said plurality of reconfigurable nodes may include information insertion devices selectively optically connectable to said at least a signal input and adapted to insert signaling information into the optical signals and information extraction devices selectively optically connectable to said at least a signal output and adapted to extract signaling information from the optical signals.

Said information insertion. devices and said information extraction devices may include optical transponders optically coupling said optical switch unit to said first and second carrier and adapted to change the signals wavelengths.

At least one of said reconfigurable nodes may include at least a first signal spitter adapted to receive a signal from either the first or the second carrier and to split said signal into a first and a second fraction which are sent towards a respective signal output and towards the same carrier, respectively.

Moreover, at least one of said reconfigurable nodes may include at least a second signal spitter optically coupled to a respective signal input and adapted to spit a signal coming from the respective signal input into a first and a second fraction which are sent towards the first carrier and the second carrier, respectively.

Said optical switch unit may include at least a first switch having a first input optically coupled to a respective signal input, a second input coupled to either the first or the second carrier and an output coupled the same carrier.

Said optical switch unit may further include at least a second switch having a first input coupled to the first carrier, a second input coupled the second carrier, and an output optically coupled to a respective signal output.

The present invention also relates to an optical transmission system including a first and a second ring network, each network including a first and a second optical carrier having opposite transmission directions and a plurality of optically reconfigurable nodes optically connected along the first and the second optical carrier and adapted to communicate in pairs by means of respective links susceptible of failure, each network having a normal operative condition in which the nodes of each pair are optically configured so as to exchange optical signals on a respective working arc path at a respective first wavelength on the first carrier and at a respective second wavelength different from said first wavelength on the second carrier, said respective working path having a complementary arc path defining a respective protection arc path in which the first wavelength on the first carrier and the second wavelength on the second carrier can be used for further links and the first wavelength on the second carrier and the second wavelength on the first carrier are reserved for protection, each network having a failure operative condition in which the nodes terminating a failed link are optically reconfigured so as to exchange optical signals on the respective protection arc path at the respective second wavelength on the first carrier and at the respective first wavelength on the second carrier, each of said plurality of reconfigurable nodes including at least a signal input, at least a signal output and a reconfigurable optical switch unit selectively coupling said at least an signal input and said at least a signal output to said first and second carriers, wherein a first reconfigurable node of the first ring network has a signal input which is optically coupled to a signal output of a second reconfigurable node of the second ring network.

The second reconfigurable node preferably has a signal input which is optically coupled to a signal output of the first reconfigurable node.

Preferably, a third reconfigurable node of the first ring network has a signal input which is optically coupled to a signal output of a fourth reconfigurable node of the second ring network, and the fourth reconfigurable node has a signal input which is optically coupled to a signal output of the third reconfigurable node.

According to a further aspect, the present invention relates to a method to autoprotect an optical ring network, said ring network including a first and a second optical carrier having opposite transmission directions and a plurality of nodes optically connected along the first and the second optical carrier and adapted to communicate in pairs in order to define bidirectional links, each pair including a first and a second link termination node adapted to mutually communicate at respective first and second wavelengths, the method including:

exchanging signals between the first and the second link termination node of each pair on a respective working arc path of said ring network by using the respective first wavelength on the first carrier and the respective second wavelength on the second carrier; said respective working path having a complementary arc path defining a respective protection arc path in which the first wavelength on the first carrier and the second wavelength on the second carrier can be used for further links and the first wavelength on the second carrier and the second wavelength on the first carrier are reserved for protection;

checking if a failure is present in the ring network producing at least a failed link; and optically reconfiguring, in the presence of a failure, the link terminating nodes of said at least a failed link so that they exchange signals on the respective protection arc path by using the respective first wavelength on the second carrier and the respective first wavelength on the second carrier.

Preferably, each node of said plurality of nodes is adapted to manage a predetermined subset of wavelengths within a set of transmission wavelengths carried by the first and the second carrier, said step of exchanging including optically separating, at each node of said plurality of nodes, each wavelength of the respective subset of wavelengths from the set of transmission wavelengths.

Preferably, the method includes the steps of inputting a signal into one of said nodes, splitting said signal into a first and a second fraction and sending said first fraction towards the first carrier and the second power fraction towards. the second carrier.

Moreover, the method preferably includes the steps of receiving a signal in one of said nodes from either the first or the second carrier, splitting said signal into a first and a second fraction, sending the first fraction towards. the same carrier and the second fraction towards a signal output of said node.

The step of checking may include verifying, in each node of said plurality of nodes and for each wavelength of the respective set of wavelengths, if signals are received.

The step of checking may include verifying, in each node of said plurality of nodes and for each wavelength of the respective set of wavelengths, if signals are received degraded.

The step of checking may include verifying, in each node of said plurality of nodes and for each wavelength of the respective set of wavelengths, if signals include a failure message.

The method may further include transmitting a failure message from a first link termination node of a pair to a second link termination node of the same pair if a signal transmitted from the second link termination node to the first link termination node is not received, or is received degraded, by the first link termination node.

Advantageously, the step of reconfiguring includes switching optical connections which selectively couple at least an optical transmitter and an optical receiver to said first and second carrier.

Preferably, the step of exchanging includes feeding at each of said plurality of nodes the corresponding subset of wavelengths to said first and, respectively, second carrier.

The step of exchanging signals may include the following steps executed in the first link termination node of a pair:
generating an optical signal carrying an information;
converting the optical signal into an electrical signal;
adding to the electrical signal further information;
reconverting the electrical signal into an optical signal provided with a predetermined wavelength adapted for transmission; and
feeding the optical signal at the predetermined wavelength to either the first or the second carrier;

and the following steps executed in the second link termination node of the same pair:
receiving the optical signal at the predetermined wavelength from either the first or the second carrier;
converting the optical signal at the predetermined wavelength into an electrical signal;
extracting from the electrical signal the further information;
reconverting the electrical signal into an optical signal with a wavelength adapted for reception; and
receiving the optical signal with the wavelength adapted for reception.

According to a further aspect, the present invention relates to a reconfigurable node for an autoprotected optical communication ring network, comprising. a receiving/transmitting module including:

a signal input for the insertion into the node of a signal including information to be transmitted in the network;

a signal output for the extraction from the node of a signal including information transmitted in the network;

a first transmitting transponder for optically coupling to a first carrier of the network and adapted to modulate a signal at a first wavelength;

a second transmitting transponder for optically coupling to the first carrier and adapted to modulate a signal at a second wavelength;

a third transmitting transponder for optically coupling to a second carrier of the network and adapted to modulate a signal at the first wavelength;

a first receiving transponder for optically coupling to the second carrier and adapted to demodulate a signal having the first wavelength;

a second receiving transponder for optically coupling to the second carrier and adapted to demodulate a signal having the second wavelength;

a third receiving transponder for optically. coupling to the first carrier and adapted to demodulate a signal having the second wavelength;

reconfigurable optical connections to selectively connect:
the signal input either to the first transmitting transponder or to the third transmitting transponder;
the first receiving transponder to the third transmitting transponder;
the second receiving transponder to the signal output; and
the third receiving transponder either to the signal output or to the second transmitting transponder.

The receiving/transmitting module may further include:
a further signal input for the insertion into the node of a signal including information to be transmitted in the network;
a further signal output for the extraction from the node of a signal including information transmitted in the network;
a fourth transmitting transponder optically coupled to the second carrier and adapted to modulate a signal at the second wavelength; and
a fourth receiving transponder optically coupled to the first carrier and adapted to demodulate a signal having the first wavelength;
said reconfigurable optical connections selectively connecting:
the first receiving transponder either to the third transmitting transponder or to the further signal output;
the fourth receiving transponder to the further signal output; and
the further signal input either to the second transmitting transponder or to the fourth transmitting transponder.

Preferably, the node is adapted to manage a predetermined set of wavelengths within a set of transmission wavelengths including a first and a second optical add/drop multiplexer optically coupling the receiving/transmitting module to said first and, respectively, second carrier to feed/extract said subset of wavelengths to/from said first and, respectively, second carrier, and to pass-through the remaining wavelengths of the set of transmission wavelengths.

The node according may further include at least a first optical power splitter for splitting signals coming from said at least a signal input and at least a second optical power splitter for splitting signals coming from a respective one of said receiving transponders.

The reconfigurable optical connections may include 2×2 switches or, alternatively, 1×2 and/or 2×1 switches.

The reconfigurable optical connections may include discrete switching components or, alternatively, an integrated switching matrix.

The reconfigurable optical connections may include optical switching components selectable in the group including:
opto-mechanical switches;
thermo-optical switches;
magneto-optical switches;
liquid crystal switches;
semiconductor switches;
electro-optical switches;
micro-mechanical switches; and
lithium niobate integrated circuit switches The reconfigurable node preferably includes a control processing unit operatively connected to said receiving transponders and said transmitting transponders.

The reconfigurable node may includes at least a further receiving/transmitting module which has substantially the same structure of said receiving/transmitting module and is adapted to operate with a different pair of wavelengths with respect to said receiving/transmitting module.

BRIEF DESCRIPTION OF THE DRAWINGS

More details will become apparent from the following description, with reference to the accompanying drawings, in which:

FIGS. 1a, 1b, 1c show a network ring of a known type under normal conditions, failure condition with a multiplex section shared protection and failure condition with a multiplex section shared protection—transoceanic application.

DESCRIPTION OF THE PREFERRED EMBODIMENTS

Figure 2:
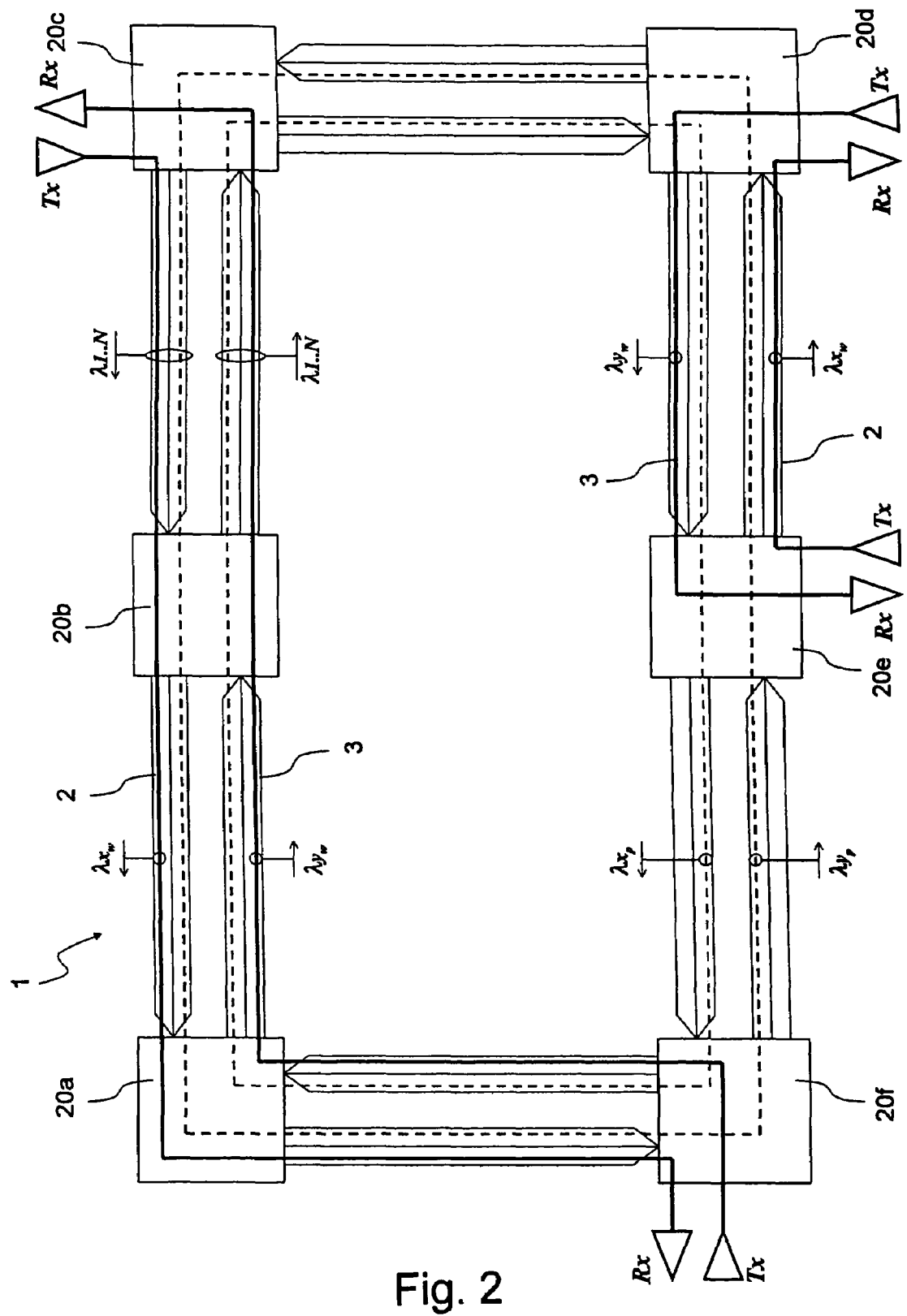
FIG. 2 is a schematic representation of an optical communication network according to the present invention, operating under normal conditions and in which, by way of example, two transmission links are defined.

Schematically shown in FIG. 2 is an optical communication ring network 1 according to the present invention. NetWork 1 includes a first and a second optical fiber ring 2, 3 defining respective optical carriers having opposite transmission directions, and a plurality of nodes 20a–20f for adding and dropping optical signals, positioned along the first and the second ring 2, 3.

Network 1 is adapted to be used for both terrestrial transmissions and transoceanic transmissions. For long-haul transmissions, in particular for transoceanic transmissions, network 1 is preferably provided with line optical amplifiers and/or boosters and/or preamplifiers (not shown).

In the schematic representation of FIG. 2, rings 2, 3 define an external and, respectively, an internal ring, having a counter-clockwise transmission direction and, respectively, a clockwise transmission direction. The nodes in network 1 have been chosen in number of six just by way of example and the present invention is identically applicable to networks including any number of nodes. Furthermore, the reference to connections comprising two optical fibers is to be considered merely as an example, the solution according to the invention being also suitable for utilization in ring networks in which the nodes are connected by a greater number of optical carriers.

Communication in network 1 is achieved according to a Wavelength Division Multiplexing (WDM) scheme using different channels at respective wavelengths on each ring. In particular, rings 2, 3 are adapted to convey optical signals in the transmission channels defined by a set of transmission wavelengths $\lambda_1, \lambda_2, \ldots, \lambda_n$ within a predetermined wavelength transmission band.

Each of the nodes 20a–20f is adapted to manage a respective subset of wavelengths within the set of transmission wavelengths $\lambda_1, \lambda_2, \ldots, \lambda_n$ and to define bidirectional communications with one or more of the other nodes of network 1. Each pair of nodes arranged to mutually communicate splits network 1 into two complementary arc paths, at least one of which (identifiable as a "working path") allows bidirectional transmission between the two nodes under normal operative conditions (i.e. without failures), and the other (identifiable as a "protection path") allows to re-route such bidirectional transmission in the presence of a failure in the working path.

In greater detail, a generic pair of nodes arranged to mutually communicate has associated respective first and second wavelengths $\lambda_x, \lambda_y$ for the exchange of data. Under normal operative conditions, on the working path defined by the considered pair of nodes, a bi-directional working link is established by transmitting optical signals at the first wavelength $\lambda_x$ on the external ring 2 (in the counter-clockwise direction) and at the second wavelength $\lambda_y$ on the internal ring 3 (in the clockwise direction). The second wavelength $\lambda_y$ is not used on the external ring 2 and the first wavelength $\lambda_x$ is not used on the internal ring 3. The second wavelength $\lambda_y$ and the first wavelength $\lambda_x$ can then be used on the external ring 2 and, respectively, on the internal ring 3, to provide optical protection, as hereinbelow described. For aim of clarity, the wavelengths which are used under normal operative conditions (i.e. $\lambda_x$ on the external ring 2 and $\lambda_y$ on the internal ring 3) to perform working links are identified with a "w" suffix ($\lambda_{x,w}, \lambda_{y,w}$), while the wavelengths which are adapted to be used for protection (i.e. $\lambda_y$ on the external ring 2 and $\lambda_x$ on the internal ring 3) are identified with a "p" suffix ($\lambda_{x,p}, \lambda_{x,p}$).

The first and the second wavelength $\lambda_x, \lambda_y$ can be used on the protection path associated to the considered pair of nodes to perform a further bidirectional working link between the first and the second node or to perform further bidirectional working links between other pairs of nodes (which may include one of the previously considered nodes), provided that those further working links do not overlap with each other and with the above considered one. Then, a generic pair of wavelengths $\lambda_x, \lambda_y$ defines a "logical ring", i.e. a virtual ring which may include many non-overlapping working links operating at $\lambda_{x,w}, \lambda_{y,w}$. Protection wavelengths $\lambda_{x,p}, \lambda_{x,p}$, not used under normal operative conditions, are shared among the different working links operating at $\lambda_{x,w}, \lambda_{y,w}$ (i.e. on the same logical ring). Overlapping working links can only be part of different logical rings and operate at different wavelengths.

The number of working links in a single logic ring depends on the client traffic pattern. For example with M nodes and N wavelengths (N even), in case of "hub traffic" (i.e. one node communicating with all the other nodes) a maximum of N protected working links can be established because each logical ring can support only two working links, while in case of "uniform traffic" (i.e. each node communicating only with its two adjacent) a maximum of MN/2 protected working links are available because each logical ring (i.e. each pair of wavelengths) can support M working links.

In the example of FIG. 2, one working link is set up between node 20c and node 20f using the first working wavelength $\lambda_{x,w}$ on the external ring 2 and the second working wavelength $\lambda_{y,w}$ on the internal ring 3. Another working link is set up with the same wavelengths (and directions of propagation on the two rings 2, 3) between node 20d and node 20e. In this example, it is also possible to use the same wavelengths to set up a working link between node 20c and node 20d and between node 20e and node 20f, but it is not possible for example to set up a working link between node 20b and node 20e because it will overlap with the ring arcs already used by the previous links.

As later described in greater detail, each of nodes 20a–20f provides optical add/drop/bypass functions for each wavelength within the wavelength transmission band on both the external and internal fiber rings 2, 3, together with optical amplification and regeneration (if necessary).

Figure 3:
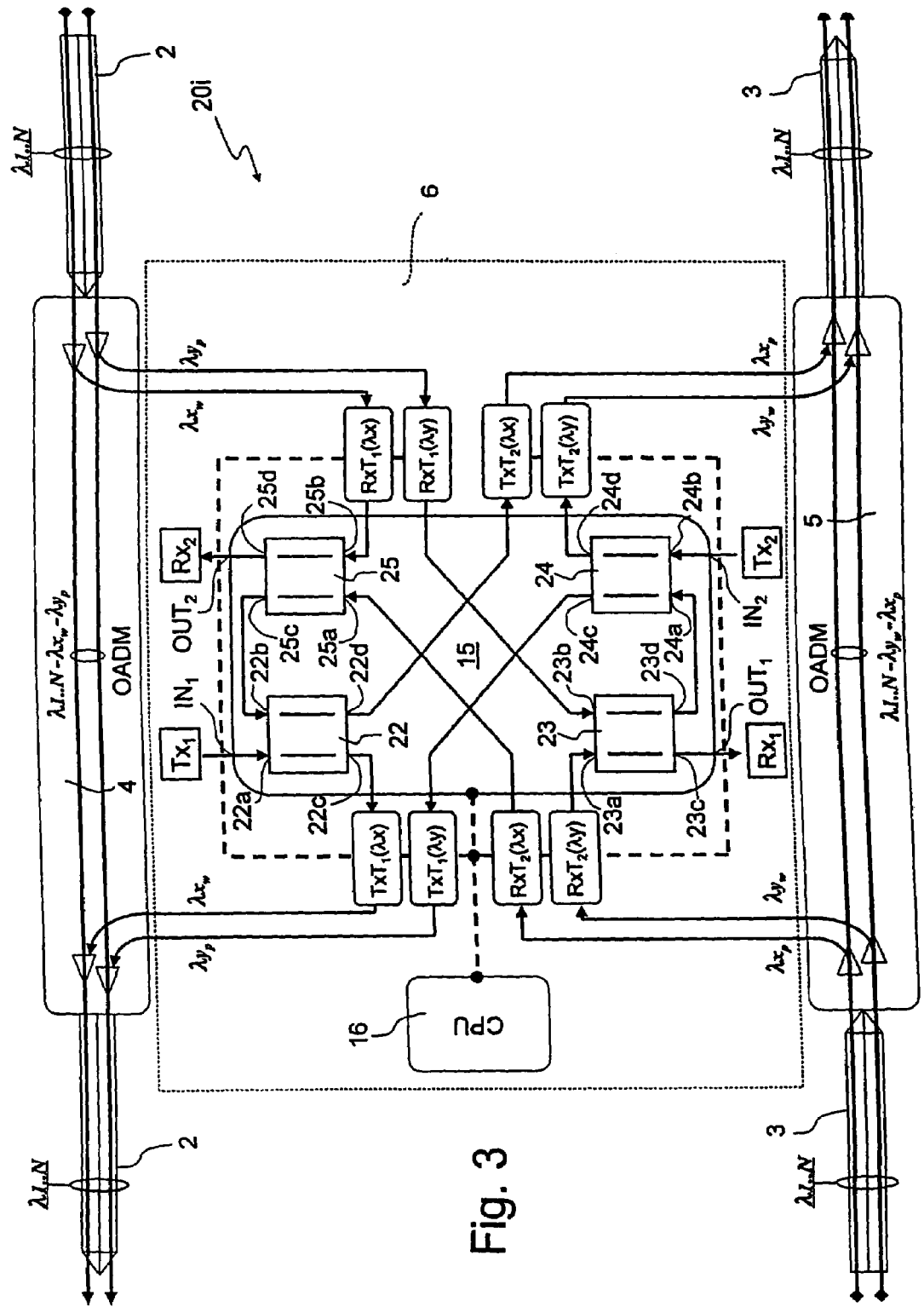
FIG. 3 is a more detailed representation of one node of the network of FIG. 2, including a switching unit comprising 2×2 switches and operating under normal conditions.

FIG. 3 shows the structure of a generic node 20*i* of network 1, in particular of one node operating at wavelengths and $\lambda_x$, and $\lambda_y$.

Node 20*i* includes a first and a second optical add/drop multiplexer (OADM) 4, 5 and a receiving/transmitting module 6 comprising:
- a first and a second signal input $IN_1$, $IN_2$;
- a first and a second signal output $OUT_1$, $OUT_2$;
- a first, a second, a third and a fourth transmitting transponder $TxT_1(\lambda_x)$, $TxT_1(\lambda_y)$, $TxT_2(\lambda_x)$, $TxT_2(\lambda_y)$;
- a first, a second, a third and a fourth receiving transponder $RxT_1(\lambda_x)$, $RxT_1(\lambda_y)$, $RxT_2(\lambda_x)$, $RxT_2(\lambda_y)$;
- a switch unit 15; and
- a central processing unit (CPU) 16.

The first and the second OADM 4, 5 are adapted to insert into rings 2, 3, and to extract from rings 2, 3, signals at the working and protection wavelengths associated to node 20*i* (i.e. $\lambda_x$ and $\lambda_y$) and to by-pass the other wavelengths of the set of transmission wavelengths. If required, OADMs 4, 5 may perform other functions within the wavelength transmission band, such as regeneration, performance monitoring, etc. In greater detail, the first OADM 4 is coupled to the fiber of the external ring 2 for dropping signals from, and adding signals into, the external ring 2, and the second OADM 5 is coupled to the fiber of the internal ring 3 for dropping signals from, and adding signals into, the internal ring 3. OADMs 4 and 5 may be, for example, of the type Pirelli Optical Systems OADM/P4-R1 (WaveMux6400 product family).

Inputs $IN_1$, $IN_2$ and outputs $OUT_1$, $OUT_2$ represent the client access points for the input and the output of information. Inputs $IN_1$, $IN_2$ can be optical coupled to optical transmitters $Tx_1$, $Tx_2$ and outputs $OUT_1$, $OUT_2$ can be optical coupled to optical receivers $Rx_1$, $Rx_2$, as illustrated in FIG. 3. Transmitters $Tx_1$, $Tx_2$ allow the input of information addressed to two different receivers connected to network 1. The input of information by transmitters $Tx_1$, $Tx_2$ may be performed at wavelengths not included in the transmission wavelength band of network 1, since the transmitting transponders TxTs are in charge to provide the signals with the correct wavelength, i.e. with the first wavelength $\lambda_x$ or the second wavelength $\lambda_y$. $Tx_1$, $Tx_2$ may be, for example, for example a standard Sonet OC-48/SDH STM-16 terminal (produced for example by Nortel). Different bit rate terminals can be used provided that the transmitting transponders are compatible.

Receivers $Rx_1$, $Rx_2$ allow the output of information coming from two different transmitters connected to network 1. Receivers $Rx_1$, $Rx_2$ may be adapted to receive signals at wavelengths not included in the transmission wavelength band of network 1, since receiving transponders RxTs are in charge to provide the signals coming from the network 1 with a wavelength adapted for reception receivers $Rx_1$, $Rx_2$. $Rx_1$, $Rx_2$ may be, for example, a standard Sonet OC-48/SDH STM-16 terminal (produced for example by Nortel). Different bit rate terminals can be used provided that the receiving transponders are compatible.

The first and the second transmitting transponder $TxT_1(\lambda_x)$, $TxT_1(\lambda_y)$ are optically coupled to the external ring 2 by means of the first OADM 4 and are adapted to feed signals at wavelength $\lambda_x$ and, respectively, $\lambda_y$, to the external ring 12; the third and the fourth transmitting transponder $TxT_2(\lambda_x)$, $TxT_2(\lambda_y)$ are optically coupled to the internal ring 3 by means of the second OADM 5 and are adapted to feed signals at wavelength $\lambda_x$ and, respectively, $\lambda_y$, to the internal ring 3.

In detail, each transmitting transponder $TxT_1(\lambda_x)$, $TxT_1(\lambda_y)$ $TxT_2(\lambda_x)$, $TxT_2(\lambda_y)$ may be of a type adapted to receive an optical signal from switch unit 15, to transform it into electrical format for processing and to newly transform it into optical format for transmission, with a predetermined wavelength within the wavelength band. Transmitting transponders of this type are, for example, Pirelli Optical Systems WCM/F-xxx (WaveMux6400 product family, xxx=output wavelength code). Alternatively, the transmitting transponder may be completely optical devices (for example based on SOAs, Semiconductor Optical Amplifiers) managing information associated to the signal, for example managing a pilot tone over-modulating the optical wavelength carrying the signal.

Processing, in this case, includes providing the transmitted signals with information for protection purposes (e.g. channel identifier, performance monitoring, protection protocol) as a channel overhead. This information is not part of the client payload and are added to the signal by the transmitting transponders under the supervision of the CPU. For example the Pirelli Optical Systems WCM/F-xxx unit is able to add an overhead. channel to the client payload to transport the signaling information. A similar technique, but operating at the multiplex section level, is used in the Sonet/SDH protocol at the transmitting side (e.g. channel overhead, multiplex section overhead with B1 monitor byte and K1/K2 APS bytes).

The first and the second receiving transponder $RxT_1(\lambda_x)$, $RxT_1(\lambda_y)$ are optically coupled to the external ring 2 by means of the first OAOM 4 and are adapted to receive signals at wavelength $\lambda_x$ and, respectively, $\lambda_y$; the third and the fourth receiving transponder $RxT_2(\lambda_x)$, $RxT_2(\lambda_y)$ are optically coupled to the internal ring 3 by means of the second OADM 5 and are adapted to receive signals at wavelength $\lambda_x$ and, respectively, $\lambda_y$.

In detail, each receiving transponder $RxT_1(\lambda_x)$, $RxT_1(\lambda_y)$, $RxT_2(\lambda_x)$, $RxT_2(\lambda_y)$ may be of the type adapted to receive an optical signal from rings 2, 3, to transform it into electrical format for processing and to newly transform it into optical format, with a predetermined wavelength adapted for reception by a corresponding receiver $RX_1$, $Rx_2$. Receiving transponders of this type are, for example, Pirelli Optical Systems RXT-DM/F (WaveMux6400 product family). Alternatively, the receiving transponders, like the transmitting transponders, may be completely optical devices (for example based on SOAs, Semiconductor Optical Amplifiers) managing information associated to the signal, for example to a pilot tone over-modulating the optical wavelength carrying the signal.

Processing, in this case, includes extracting from the received signals the information previously inserted as channel overhead by the corresponding TXT at the transmitting node for protection purposes (e.g. channel identifier, performance monitoring, protection protocol). For example the Pirelli Optical Systems RXT-DM/F unit is able to extract an overhead channel from the received signal to process the signaling information. A similar technique, but operating at the multiplex section level, is used in the Sonet/SDH protocol at the receiving side (e.g. channel overhead, multiplex section overhead with B1 monitor byte and K1/K2 APS bytes).

CPU 16 is in charge to communicate with the transmitting and receiving transponders TxTs, RxTs in order to provide or to process the information related to the working links (link signaling), to check the operative conditions of the related working links and to control switch unit 15 in accordance to the detected operative conditions. Link signaling must include channel identification information which can be implemented for example either by means of a. pilot tone over-modulating the optical wavelength carrying the signal or by using a TDM (Time Division Multiplexing) frame structure including the signal channels together with an extra channel for link signaling transmission. Logical connections between CPU 16 and its controlled units are represented in FIG. 3 by means of dashed lines.

Switch unit 15 is adapted to provide the optical switching facilities implementing the protection layout as disclosed in this invention, by selectively connecting transmitters Txs and receivers Rxs to transmitting transponders TxTs and receiving transponders RxTs. As shown in FIG. 3, switch unit 15 may comprise a first, a second, a third and a fourth 2×2 optical switch 22–25 driven by CPU 16 through appropriate control logics (not shown). Optical switches 22–25 may be, for example, 2×2 optomechanical switches (e.g. of the type produced by JDS FITEL, INC., 570 Heston Drive, Nepean, Ontario (Calif.) or of the type produced by E-TEK DYNAMICS, INC., 1885 Lundy Ave., San Jose, Calif. (USA)). Optical switches 22–25 are connected as follows:

the first switch 22 has a first input 22a coupled to the first transmitter $TX_1$ via the first signal input $IN_1$, a second input 22b, a first output 22c coupled to the first transmitting transponder $TxT_1(\lambda_x)$ and a second output 22d coupled to the third transmitting transponder $TxT_2(\lambda_x)$;

the second switch 23 has a first input 23a coupled to the fourth receiving transponder $RxT_2(\lambda_y)$, a second input 23b coupled to the second receiving transponder $RxT_1(\lambda_y)$, a first output 23c coupled to the first receiver $Rx_1$ via the first signal output $OUT_1$, and a second output 23d;

the third switch 24 has a first input 24a coupled to the second output 23d of the second switch 23, a second input 24b coupled to the second transmitter $TX_2$ via the second signal input $IN_2$, a first output 24c coupled to the second transmitting transponder $TxT_1(\lambda_y)$ and a second output 24d coupled to the fourth transmitting transponder $TxT_2(\lambda_y)$; and the fourth switch 25 has a first input 25a coupled to the third receiving transponder $RxT_2(\lambda_x)$, a second input 25b coupled to the first receiving transponder $RxT_1(\lambda_x)$, a first output 25c coupled to the second input 22b of the first switch 22 and a second output 25d coupled to the second receiver $Rx_2$ via the second signal output $OUT_2$.

Each switch 22–25 can operate in a bypass status (typically used under normal conditions), in which the first input is coupled to the first output and the second input is coupled to the second output, or in a switched status (typically used in case of failure), in which the first input is coupled to the second output and the second input is coupled to the first output.

The architecture of FIG. 3 is modular and can be applied for each logical ring in which the node acts as a link termination. In other words, node 20i may include a plurality of modules 6, each for managing a different pair of wavelength. In this case, the wavelengths assigned to each logical ring are separately added/dropped by the two OADMs 4, 5 and processed separately by a corresponding module 6.

It has to be noted that the functional layout of the node described above can be physically implemented in different ways, for example integrating the CPU 16 or the transponders 6–13 inside the switch unit 15.

Switch unit 15 is over-dimensioned for the switching requirements of node 201 and it defines, in case of failure, some interconnections which are not operatively used. For example, while the first receiving transponder $RxT_1(\lambda_x)$ is connected to the second receiver $Rx_2$ under normal operative conditions, no connection is needed for the first receiving transponder $RxT_1(\lambda_x)$ in case of failure on the external ring 2 on the right-hand side of node 20i (since no signal is received from this side). Taking into consideration this over-dimensioning of the switch unit functionality, it is possible to use, in place of the 2×2 switch type unit, other unit architectures which allow to optimize the number of interconnections in relation to the functional requirements. An interconnection example in node 20i under both normal and failure conditions (i.e. for working and protection) is summarized in the following table:

|  | $Rx_1$ | $Rx_2$ | $TXT_1(\lambda x)$ | $TXT_1(\lambda y)$ | $TXT_2(\lambda x)$ | $TXT_2(\lambda y)$ |
|---|---|---|---|---|---|---|
| $Tx_1$ |  | W |  | | P | |
| $Tx_2$ |  |  |  | P |  | W |
| $RXT_1(\lambda x)$ |  | W |  |  |  | |
| $RXT_1(\lambda y)$ | P |  |  | W |  | |
| $RXT_2(\lambda x)$ |  | P |  |  | W | |
| $RXT_2(\lambda y)$ | W |  |  |  |  | |

W = Working
P = Protection

Figure 4:
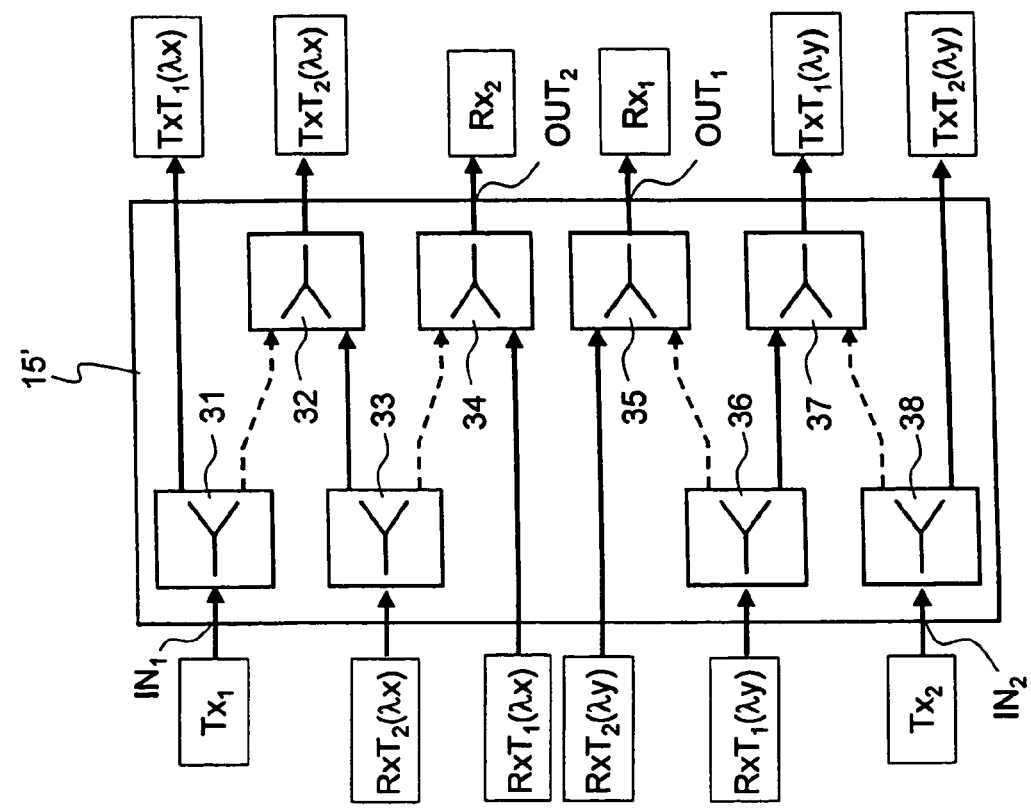
FIG. 4 shows a switching unit comprising 1×2 and 2×1 switches used in the network of FIG. 2 in place of the switching unit comprising 2×2 switches, operating under normal conditions.

FIG. 4 shows a switch unit 15' including 1×2 and 2×1 optomechanical switches, to be used in place of switch unit 15. Switch unit 15' implements the required interconnection functionality and can be, for example, of the type produced by JDS FITEL, INC., 570 Heston Drive, Nepean, Ontario (Calif.) or of the type produced by E-TEK DYNAMICS, INC., 1885 Lundy Ave., San Jose, Calif. (USA). In FIG. 4, for reason of clarity, the input connections and the output connections of switch, unit 15' are grouped on the left side and, respectively, on the right side of switch unit 15'. In detail, switch unit 15' include:

a first switch 31 of the 1×2 type, having its input coupled to the first transmitter $TX_1$ (via the first signal input $IN_1$), and its first output coupled to the first transmitting transponder $TxT_1(\lambda_x)$;

a second switch 32 of the 2×1 type, having its first input coupled to the second output of the first switch 31 and its output coupled to the third transmitting transponder $TxT_2(\lambda_x)$;

a third switch 33 of the 1×2 type, having its input coupled to the third receiving transponder $RxT_2(\lambda_x)$ and its first output coupled to the second input of the second switch 32;

a fourth switch 34 of the 2×1 type, having its first input coupled to the second output of the third switch 33, its second input coupled to the first receiving transponder $RxT_1(\lambda_x)$ and its output coupled to the second receiver $Rx_2$ (via the second signal output $OUT_2$);

a fifth switch 35 of the 2×1 type, having its first input coupled to the fourth receiving transponder $RxT_2(\lambda_y)$ and its output coupled to the first receiver $Rx_1$ (via the first signal output $OUT_1$);

a sixth switch 36 of the 1×2 type, having its input coupled to the second receiving transponder $RxT_1(\lambda_y)$ and a first output coupled to the second input of the fifth switch 35;

a seventh switch 37 of the 2×1 type, having its first input coupled to the second output of the sixth switch 36 and its output coupled to the second transmitting transponder $TxT_1(\lambda_y)$; and an eighth switch 38 of the 1×2 type, having its input coupled to the second transmitter $TX_2$ (via the second signal input $IN_2$), its first output coupled to the second input of the seventh switch 37 and its second output coupled to the fourth transmitting transponder $TxT_2$ ($\lambda_y$).

In FIG. 4, connections which are operative under normal conditions are shown with a continuous line, while connections which are not used under normal conditions are represented with a dashed line.

Figure 5:
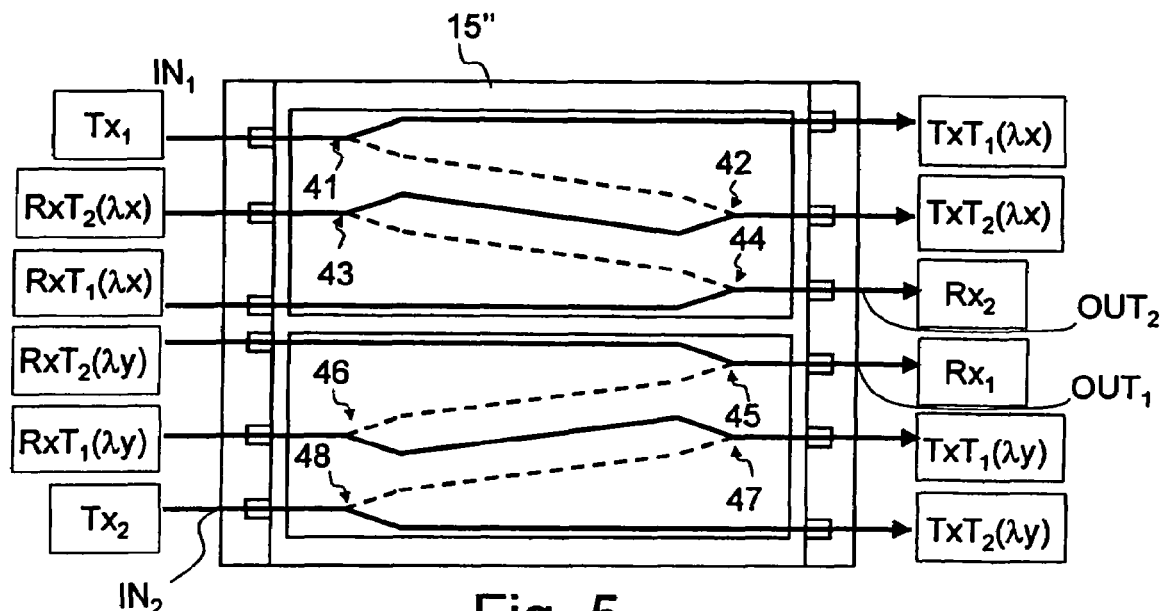
FIG. 5 shows a switching unit comprising an integrated switching circuit used in the network of FIG. 2 in place of the switching unit comprising 2×2 switches, operating under normal conditions.

In a further possible embodiment shown in FIG. 5, the switch unit, here indicated with 15", includes a lithium niobate (LiNbO$_3$) integrated switching matrix, in which interconnections among input and outputs reproduce the layout of the switch unit 15' of FIG. 4. In particular, switch unit 15" includes four 1×2 switches each comprising:

- an input waveguide,
- a Y-shaped branching waveguide having one input arm connected to input waveguide and having two output arms, and
- a first and a second output waveguides each connected to one of the output arms of the branching waveguide, and four 2×1 switches each comprising:

- a first and a second input waveguide,
- a Y-shaped branching waveguide having two. input arms connected to the input waveguide and one output arm, and
- a first output waveguide connected to the output arm of the branching waveguide.

Switch unit 15" also includes electrodes (not shown) formed on the surface of substrate in correspondence of the Y-shaped branching waveguides and adapted to produce the switching action between the two arms of the Y.

In detail, switch unit 15" includes:

a first switch 41 (1×2) having its input waveguide coupled to the first transmitter $TX_1$ (via the first signal input $IN_1$) and its first output waveguide coupled to the first transmitting transponder $TxT_1$($\lambda_x$);

a second switch 42 (2×1) having its first input waveguide coupled to the second output waveguide of the first switch 41 and its output waveguide coupled to the third transmitting transponder $TxT_2$($\lambda_x$);

a third switch 43 (1×2) having its input waveguide coupled to the third receiving transponder $RxT_2$($\lambda_x$) and its first output waveguide coupled to the second input waveguide of the second switch 42;

a fourth switch 44 (2×1) having its first input waveguide coupled to the second output waveguide of the third switch 43, its second input waveguide coupled to the first receiving transponder $RxT_1$($\lambda_x$) and its output waveguide coupled to the second receiver $Rx_2$ (via the second signal output $OUT_2$);

a fifth switch 45 (2×1) having its first input waveguide coupled to the fourth receiving transponder $RxT_2$($\lambda_y$) and its output waveguide coupled to the first receiver $Rx_1$ (via the first signal output $OUT_1$);

a sixth switch 46 (1×2) having its input waveguide coupled to the second receiving transponder $RxT_1$($\lambda_y$) and its first output waveguide coupled to the second input waveguide of the fifth switch 45;

a seventh switch 47 (2×1) having a first input waveguide coupled to the second output waveguide of the sixth switch 46 and an output waveguide coupled to the second transmitting transponder $TxT_1$($\lambda_y$); and an eighth switch 48 (1×2) having an input waveguide coupled to the second transmitter $TX_2$ (via the second signal input $IN_2$), a first output waveguide coupled to the second input waveguide of the seventh switch 47 and a second output waveguide coupled to the fourth transmitting transponder $TxT_2$($\lambda_y$).

In FIG. 5, connections which are operative under normal conditions are shown with a continuous line, while connections. which are not used under normal conditions are represented with a dashed line.

The use of an integrated switching matrix offers several advantages over a discrete components switching matrix. In particular:

- opto-mechanical switch units 15 and 15' are more cumbersome than the integrated switch unit 15"; for example, a typical 2×2 opto-:mechanical switch may occupy a surface of about 48×18 mm$^2$, and four switches are needed to form the switch unit 15, while the integrated switch unit 15" may occupy an area of about 4×65 mm$^2$;
- integrated switch unit 15" has response times lower than opto-mechanical switch units 15 and 15'; in fact, integrated switch unit 15" allows response times of about 1 ms, while opto-mechanical switch units 15 and 15' have typical response times of about 5–10 ms;
- the use of a single integrated device in place of four 2×2 switches or eight 1×2 and 2×1 switches allows to simplify the piloting electronic circuit;
- integrated switch unit 15" is cheaper than opto-mechanical switch units 15 and 15'.

Alternatively to the optomechanical switch units 15 and 15' and to the lithium niobate integrated switch unit 15", other types of optical switch units may be used, including either a discrete components switching matrix or an integrated switching matrix, for example including thermo-optical switches, magneto-optical switches, liquid crystal switches, SOA (Semiconductor Optical Amplifier) switches, electro-optical switches and micro-mechanical switches (MEMS).

Figure 6:
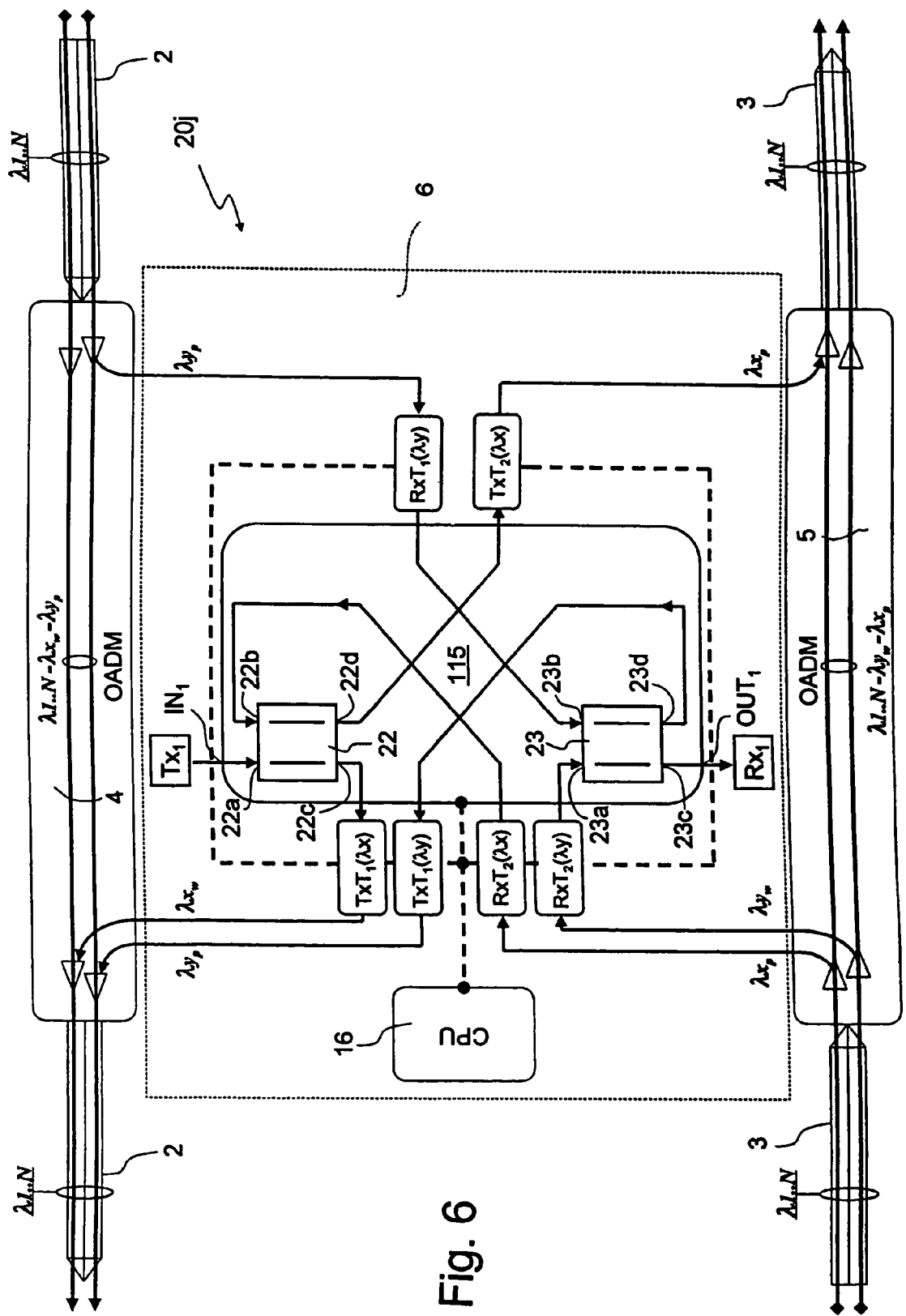
FIG. 6 illustrates a sub-equipped node for the network of FIG. 2, adapted to manage only one transmission link and including 2×2 switches.

The node structure previously described is adapted to manage two working links on the same logical ring. Anyway, if the client traffic pattern requires only one working link to be terminated at a generic node, this node may be sub-equipped. This situation is depicted in FIG. 6, where a generic one-link node 20j adapted to manage a single working link in its left-hand side is shown under normal operative conditions.

Node 20j differs from the node 20i of FIG. 3 in that the second signal input $IN_2$, the second transmitter $TX_2$, the second signal output $OUT_2$, the second receiver $Rx_2$ the first receiving transponder $RxT_1$($\lambda_x$) and the fourth transmitting transponder $TxT_2$($\lambda_y$) of node 20i are absent, and in that it includes a switch unit 115 which does not comprise the third and the fourth switch 24, 25 of switch unit 15. Therefore, differently from the architecture of FIG. 3, the third receiving transponder $RxT_2$($\lambda_x$) is directly coupled to the second input 22b of the first switch 22 and the second output 23d of the second switch 23 is directly coupled to the second transmitting transponder $TxT_1$($\lambda_y$). The single working link managed by node 20j includes signals sent by node 20j to another node at the working wavelength $\lambda_{x,w}$ on the external ring 2 and signals received by node 20j from the other node at the working wavelength $\lambda_{y,w}$ on the internal ring 3. Protection wavelengths $\lambda_{x,p}$ and $\lambda_{y,p}$ are managed in the same way as described before for the two-link node.

Figure 7:
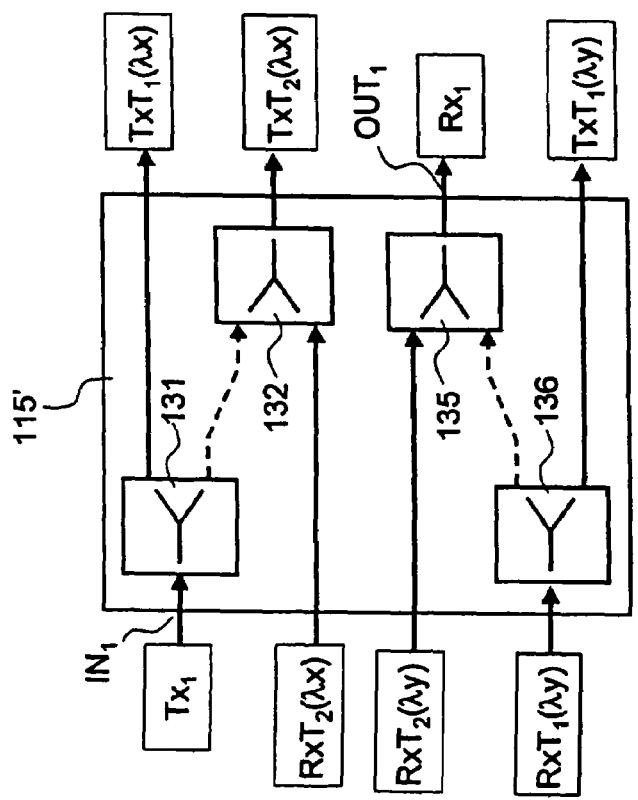
FIG. 7 shows a switching unit comprising 1×2 and 2×1 switches used in the network of FIG. 6 in place of the switching unit comprising 2×2 switches, under normal operative conditions.

FIG. 7 shows an alternative switch unit 115' for a one-link node to be used in place of switch unit 115. Switch unit 115' includes 1×2 and 2×1 optomechanical switches of the same type as those of switch unit 15' and implements the interconnection functionality required for node 20*j*, omitting the unused interconnections. For sake of clarity, input connections and output connections of switch unit 115' are grouped on the left side and, respectively, on the right side of switch unit 115'.

Switch unit 115' includes a first switch 131 (1×2), a second switch 132 (2×1), a third switch 135 (2×1) and a fourth switch 136 (1×2) respectively equivalent to switches 31, 32, 35 and 36 of switch unit 15' (FIG. 4) and differs from switch unit 15' in that switches 33, 34, 37 and 38 of switch unit 15' are absent.

In detail, switch unit 115' include:

a first switch 131 of the 1×2 type, having its input coupled to the first transmitter $TX_1$ via the first signal input $IN_1$ and its first output coupled to the first transmitting transponder $TxT_1(\lambda_x)$;

a second switch 132 of the 2×1 type, having its first input coupled to the second output of the first switch 131, its second input coupled to the third receiving transponder $RxT_2(\lambda_x)$ and its output coupled to the third transmitting transponder $TxT_2(\lambda_x)$;

a third switch 135 of the 2×1 type, having its first input coupled to the fourth receiving transponder $RxT_2(\lambda_y)$ and its output coupled to the first receiver $Rx_1$ via the first signal output $OUT_1$; and a fourth switch 136 of the 1×2 type, having its input coupled to the second receiving transponder $RxT_1(\lambda_y)$, a first output coupled to the second input of the third switch 135 and a second output coupled to the second transmitting transponder $TxT_1(\lambda_y)$.

In FIG. 7, connections which are operative under normal conditions are shown with a continuous line, while connections which are not used under normal conditions are represented with a dashed line.

Figure 8:
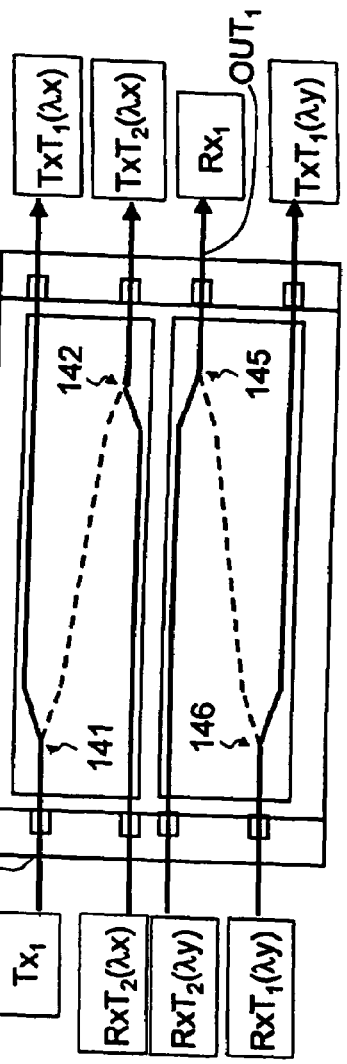
FIG. 8 shows a switching unit comprising an integrated switching circuit used in the network of FIG. 6 in place of the switching unit comprising 2×2 switches, under normal operative conditions.

FIG. 8 shows an integrated optics switch unit 115" having the same switching architecture of switch unit 115' of FIG. 7, but realized using the same technology of switch unit 15" of FIG. 5, i.e. lithium niobate (LiNbO$_3$) integrated circuit technology. Switch unit 115" includes a first switch 141 (1×2), a second switch 142 (2×1), a third switch 145 (2×1) and a fourth switch 146 (1×2) performing the same signal routing as the corresponding switches of switch unit 115' (FIG. 7).

Alternatively, switch units 115, 115' and 115" may include switches selectable in the set comprising thermo-optical switches, magneto-optical switches, liquid crystal switches, SOA (Semiconductor Optical Amplifier) switches, electro-optical switches. and micro-mechanical switches (MEMS).

Network 1 operates as follows.

When a link between a first and a second node of the network 1 has to be established, a generic pair of first and second wavelengths $\lambda_x$, $\lambda_y$ is chosen within the wavelength band. A working link is then set up between the two nodes by connecting the first transmitter $Tx_1$ of the first node to the second receiver $Rx_2$ of the second node using the first wavelength $\lambda_x$ on the external ring 2, and by connecting the second transmitter $Tx_2$ of the second node to the first receiver $Rx_1$ of the first node using the second wavelength $\lambda_y$ on the internal ring 3, on a same working arc path. As previously described, other working links may be set up in the protection path of the two considered nodes, provided that the working path used by each working link is non-overlapping with other working paths used by other working links using the same wavelengths. In the case here considered, the second wavelength $\lambda_y$ on the external ring 2 and the first wavelength $\lambda_x$ on the internal ring 3 are not used under normal operative conditions, and are reserved for optical protection (i.e. are reserved for use in case of failure).

Each working link is under control of the two nodes at the end of the link itself. This means that, for a working link operating at working wavelengths $\lambda_{x,w}$, $\lambda_{y,w}$, the two nodes at the end of this link must provide the add/drop functions on working wavelengths $\lambda_{x,w}$ and $\lambda_{y,w}$ to/from the set of transmission wavelengths $\lambda_1, \ldots, \lambda_N$. Moreover, all the required monitoring functions on the transmitted signals (e.g. optical power level, channel identifier, BER performance, etc.) have to be carried out at these terminating nodes. It has to be noted that the nodes not involved in communications on working wavelengths $\lambda_{x,w}$ and $\lambda_{y,w}$ do not provide any function on them, and these wavelengths are directly bypassed. Each node at the end of a working link using wavelengths $\lambda_{x,w}$ and $\lambda_{y,w}$ must also have the control on the protection wavelengths $\lambda_{x,p}$ and $\lambda_{y,p}$, being these wavelengths shared for protection among all the working links of the corresponding logical ring. The other nodes (i.e. the nodes external this logical ring) are not required to perform any operation on $\lambda_{x,p}$ and $\lambda_{y,p}$, and these wavelengths are simply bypassed in these nodes. As a general rule, the nodes not included in a logical ring (i.e. not terminating a generic working link on this logical ring) can be completely transparent to the wavelengths associated to the logical ring.

In the example of FIG. 2, the working link between node 20*c* and node 20*f* operating on working wavelengths $\lambda_{x,w}$ and $\lambda_{y,w}$ is under control of these two nodes, and the working link between node 20*d* and 20*e* operating on the same wavelengths is under control of these two last nodes. Each of the nodes 20*c*, 20*d*, 20*e* and 20*f* has also the control on the protection wavelengths $\lambda_{x,p}$, $\lambda_{y,p}$ associated to the corresponding logical ring, in order to have access to the shared protection resource.

Nodes 20*a* and 20*b* cannot be part of the logical ring operating at working wavelengths, $\lambda_{x,w}$, $\lambda_{y,w}$ and may define termination nodes of working links at wavelengths different from $\lambda_{y,w}$, $\lambda_{y,w}$. Therefore, nodes 20*a* and 20*b* do not perform any action on working wavelengths $\lambda_{x,w}$, $\lambda_{y,w}$ and protection wavelengths $\lambda_{x,p}$, $\lambda_{y,p}$, even if they may be required to provide optical amplification on the set of transmission wavelengths $\lambda_1, \ldots, \lambda_N$. Furthermore, each node may be required to provide functions like regeneration or monitoring on the bypassed wavelengths, in order to allow a constant performance control of the set of transmission wavelengths $\lambda_1, \lambda_2, \ldots, \lambda_N$ over the entire ring network. Indeed, under failure conditions, these nodes have not to provide any reconfiguration action on the channels carried by the bypassed wavelengths.

With reference to FIG. 3, the signal flow inside the generic node 20*i*, under normal operative conditions, is as follows.

In reception, the first and the second OADM 4, 5 drop the wavelengths of the logical rings to be managed. All the other wavelengths may be directly bypassed to the node output without any processing. In greater detail, the first OADM 4 drops from the set of transmission wavelengths $\lambda_1, \ldots, \lambda_N$ on the external ring 2 both the working and protection wavelengths $\lambda_{x,w}$ and $\lambda_{y,p}$ (and possibly working and protection wavelengths of other logical rings to be managed), while the second OADM 5 drops from the set of transmission wavelengths $\lambda_1, \ldots, \lambda_N$ on the internal ring 3 both the working and protection wavelengths $\lambda_{y,w}$ and $\lambda_{x,p}$ (and possibly working and protection wavelengths of other logical rings to be managed). Wavelengths $\lambda_{x,w}$, $\lambda_{y,p}$, $\lambda_{y,w}$ and $\lambda_{x,p}$ are sent directly to the respective receiving transponders $RxT_1(\lambda_x)$, $RxT_1(\lambda_y)$, $RXT_2(\lambda_y)$ and $RXT_2(\lambda_x)$, where, after conversion in electric format, information related to the link (link signaling) is extracted and sent to the CPU 16 for processing. After processing, wavelengths $\lambda_{x,w}$, $\lambda_{y,p}$, $\lambda_{y,w}$ and $\lambda_{x,p}$ are newly converted in optical format.

The first working wavelength λw is then routed through switch unit 15 to the first receiver $Rx_1$ and the second working wavelength $\lambda_{x,w}$ is routed through switch unit 15 to the second receiver $Rx_2$. The first and the second protection wavelengths $\lambda_{x,p}$ and $\lambda_{y,p}$ are by-passed through switch unit 15 to the third transmitting transponder $TxT_2(\lambda_x)$ and, respectively, to the second transmitting transponder $TxT_1(\lambda_y)$, from where they are fed to the internal ring 3 and, respectively, to the external ring 2 by the second OADM 5 and, respectively, the first OADM 4. signaling information carried by the protection wavelengths is left unchanged since no protection is required at the moment on the two working channels.

Signals generated by the first transmitter $Tx_1$ are routed through switch unit 15 to the first transmitting transponder $TxT_1(\lambda_x)$ for transmission on the first working wavelength $\lambda_{x,w}$, and signals generated by the second transmitter $Tx_2$ are routed through switch unit 15 to the fourth transmitting transponder $TxT_2(\lambda_x)$ for transmission on the second working wavelength $\lambda_{y,w}$. In the first and the fourth transmitting transponder $TxT_1(\lambda_x)$, $TxT_2(\lambda_x)$, appropriate information (link signaling, channel identifier) generated by CPU 16 is added (for example by using bytes K1 and K2 as recommended in ITU-T standard) to signals on the first working wavelength $\lambda_{x,w}$ and, respectively, on the second working wavelength $\lambda_{y,w}$. These wavelengths are then respectively to the external and internal rings 2, 3 by OADMs 4, 5.

Identical operations are performed in each receiving/transmitting module included in node 20i, for corresponding pairs of wavelengths that have to be managed by this node.

When a failure occurs, reconfiguration takes place in all those, and only those, logical rings including at least a working link whose transmission is affected by the failure. It is intended that the failure can be everything affecting the transmission between two nodes, therefore not only a fiber cut but also a failure in a node device such as a OADM or a transponder. Reconfiguration in a logical ring is performed independently from reconfiguration in the other logical rings. In particular, for each working link affected by the failure, reconfiguration takes place only at the pair of nodes terminating the link, while the nodes interposed between these terminating nodes do not perform any action to restore the failed link.

As a consequence of a failure on the generic working link operating at the working wavelengths $\lambda_{x,w}$, $\lambda_{y,w}$, the two nodes terminating the working link detect the failure condition (in the way hereinbelow described) and run the reconfiguration process by switching the transmission on the respective protection arc path using the protection wavelengths $\lambda_{x,p}$, $\lambda_{y,p}$. In practice, signals previously transmitted at the first working wavelength $\lambda_{x,w}$ on the external ring 2 are switched at the first protection wavelength $\lambda_{x,p}$ on the internal ring 3, while signals previously transmitted at the second working wavelength $\lambda_{y,w}$ on the internal ring 3 are switched, at the second protection wavelength $\lambda_{y,p}$ on the external ring 2.

The working link between the two nodes is consequently re-routed on the respective protection path by using the protection wavelengths $\lambda_{x,p}$, $\lambda_{y,p}$, if necessary through nodes which are terminating other working links on the same logical ring. These last nodes do not have to perform any action as a consequence of the reconfiguration process performed by the nodes terminating the working link affected by the failure, but must be aware of the presence of a signal carried by the protection wavelengths in order to know that the protection resource has been taken by another working link of the same logical ring. Therefore, as a consequence of the protection operations performed on the failed working link, all the other working links of the same logical ring become unprotected. This situation persist until the failure has been repaired and the transmission previously switched on the protection path has been restored on the original working link. Moreover, nodes which terminate working links sharing the same protection resource of the failed one (i.e. the working links of the same logical ring) must have the protection mechanism inhibited until normal conditions are restored.

Figure 9:
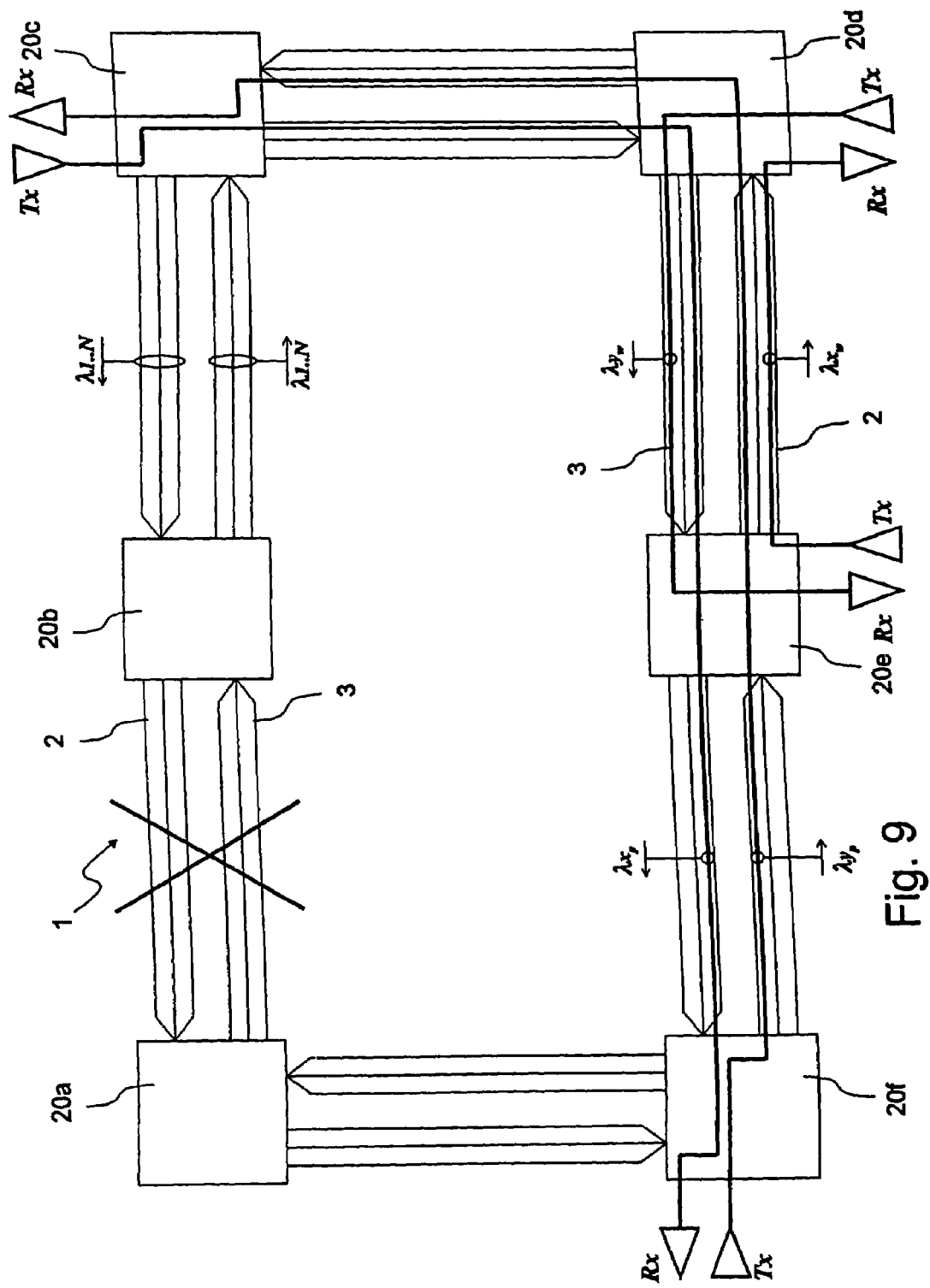
FIG. 9 illustrates the network of FIG. 2 under a failure condition.

FIG. 9 depicts a situation in which a failure occurs in the ring network of FIG. 2 between nodes 20a and 20b. According to the above, nodes 20a and 20b do not perform any action in response to the failure because, in the particular condition disclosed, they are not terminating nodes of a working link affected by the failure.

The hereinbelow described sequence of operations for the failure detection and signaling performed by nodes 20c and 20f is to be considered only as an example. Different sequence of operations may alternatively be used, without depart from the scope of the present invention, all leading to a transitory condition at the end of which nodes 20c and 20f are both reconfigured.

Supposing that the failure affects only the transmission from node 20f to node 20c (along the internal ring 3), while the opposite transmission (along the external ring 2) is still operative, node 20c detects the absence of signals or a signal quality degradation (corresponding, for example, to a BER over a predetermined threshold) at the second working wavelength $\lambda_{y,w}$ on the fourth receiving transponder $RxT_2$ $(\lambda_y)$ and, consequently, its CPU 16 operates a reconfiguration of its switch unit 15 (as hereinbelow described with reference to FIG. 10) in order to switch the transmission (in the manner described below) on the protection path. Before reconfiguration takes place, node 20c sends node 20f a failure message preferably along both the external ring 2 (in the counter-clockwise direction) and the internal ring 3 (in the clockwise direction) and preferably by using the protection wavelengths $\lambda_{y,p}$ and $\lambda_{y,p}$, to inform node 20f of the new situation.

Figure 13:
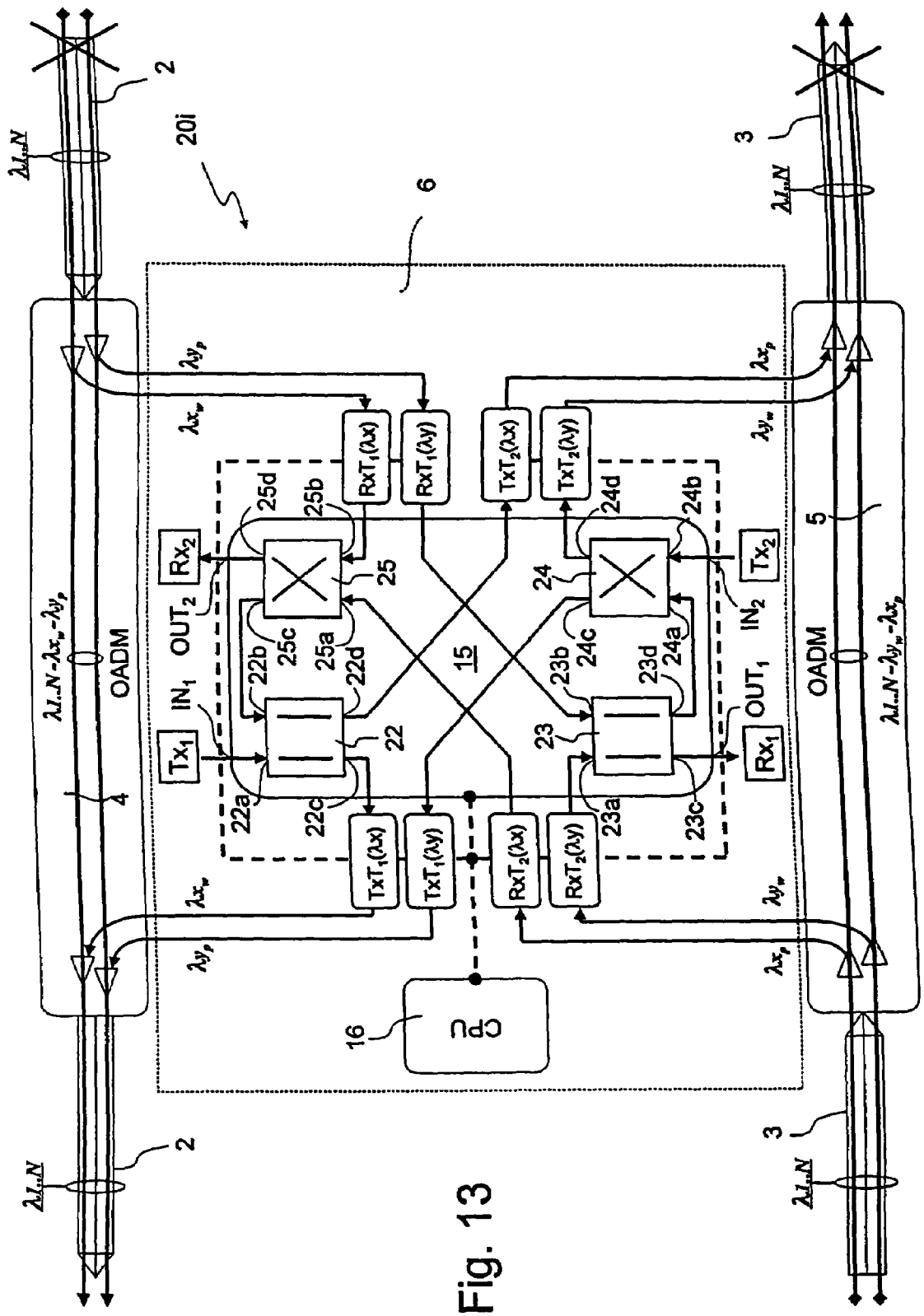
FIG. 13 shows the reconfiguration of the node of FIG. 3 when a failure occurs on its right-hand side.

In the preferred case of the bidirectional message transmission, node 20f receives the message from both the external ring 2 and the internal ring 3 (for example at the protection wavelengths $\lambda_{x,p}$ and $\lambda_{x,p}$) and reacts by performing the reconfiguration of its switch unit 15 (as shown in FIG. 13), consequently switching the transmission on the respective protection path.

On the other hand, if the failure affects only the transmission from node 20c to node 20f (along the external ring 2), a similar sequence of operations is performed starting from node 20f.

Alternatively, if both the transmission directions are affected by the failure, the first one between nodes 20c and 20f becoming aware of the absence of signals or of a signal quality degradation sends the other node the failure message (preferably along both the external ring 2 and the internal ring 3 and preferably by using the protection wavelengths $\lambda_{y,p}$ and $\lambda_{y,p}$) and subsequently operates a reconfiguration of its switch unit 15. The other node realizes the presence of a failure in the considered link either as a. consequence of the detection of the. absence of signals or of a signal quality degradation, or as a consequence of the reception of the failure message from the first node (and only from one direction, in the preferred case of the bidirectional message transmission) and, in its turn, sends a failure message to the first node and operates a reconfiguration of its switch unit 15.

At the end of the above transitory condition, signals transmitted between nodes 20c and 20f are carried on the respective protection path. Nodes 20d and 20e, which, in the example of FIG. 2, are the termination nodes of another working link in the same logical ring, are informed of the new situation by checking the status of the channel carried by the protection wavelengths bypassed (i.e. by reading the failure message), and they consequently inhibit their protection mechanism.

When the failure has been repaired, the normal condition can be restored on each affected logical ring by resetting the switching layouts at the terminating nodes of the failed working links so as to re-route such links on their original working path. On the generic logical ring, all the link terminating nodes not previously affected by the failure are informed of the release of the shared protection capacity by checking the status of the channel carried by the protection wavelengths (which are now unused). As a consequence, these link terminating nodes re-enable their protection mechanism.

Figure 10:
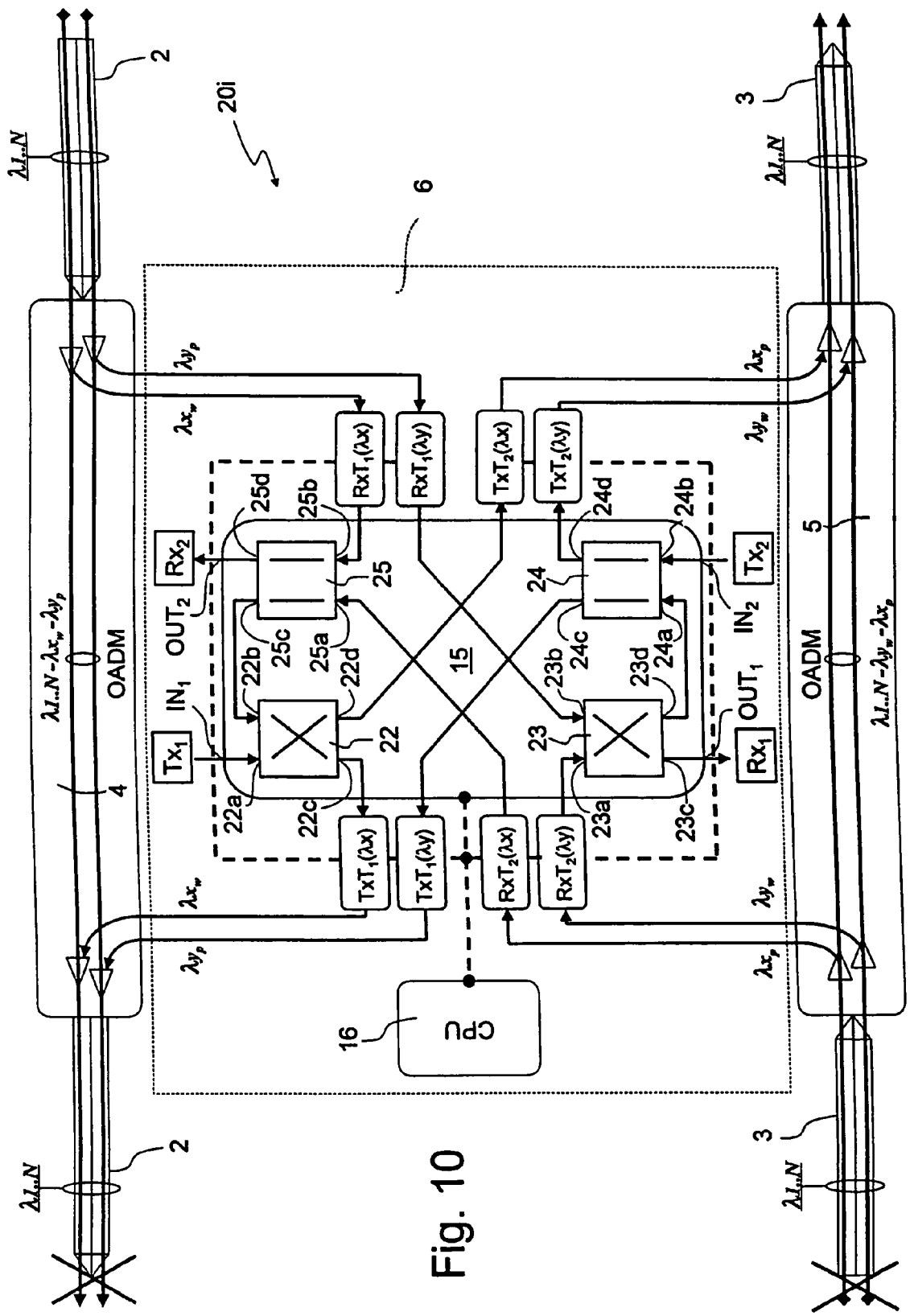
FIG. 10 shows the reconfiguration of the node of FIG. 3 when a failure occurs on its left-hand side.

FIG. 10 depicts the situation in which a failure occurs on a working link defined by the generic node 20i (together with a further node not shown), in particular a failure on the left-hand side of node 20i. Node 20i is informed of the failure condition by detecting, at the fourth receiving transponder $RxT_2(\lambda_y)$, the absence of signals, or a signal quality degradation (like a BER over a predetermined threshold), or the reception of a failure message (as previously described). CPU 16 consequently generates an appropriate failure message to be sent to the other terminating node of the working link, preferably along both the external ring 2 and the internal ring 3. CPU 16 preferably feeds this failure message to the second transmitting transponder $TxT_1(\lambda_y)$ for transmission at the second protection wavelength $\lambda_{y,p}$ and to the third transmitting transponder $TxT_2(\lambda_w)$ for transmission at the first protection wavelengths $\lambda_{x,p}$. CPU 16 subsequently operates the reconfiguration of switch unit 15, by reconfiguring switches 22 and 23 from the bypass status to the switched status in order to bypass the failed working path and re-route the transmission towards the other node of the failed working link on the respective protection path.

Figure 11:
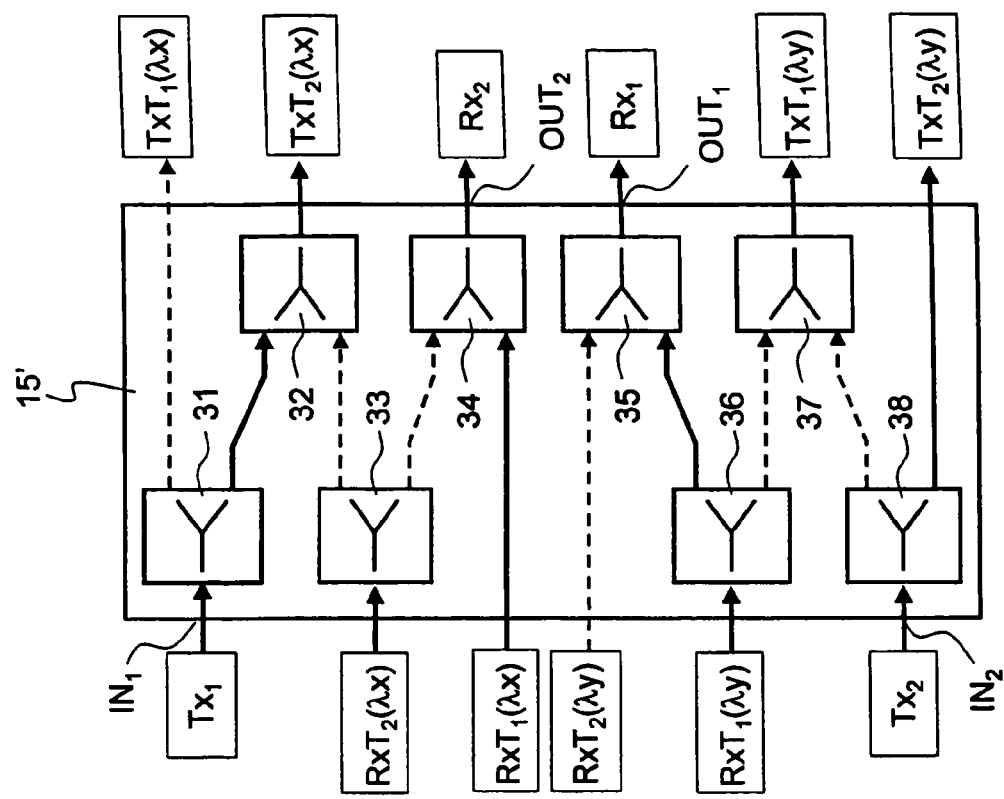
FIG. 11 shows the reconfiguration of the switching unit of FIG. 4 when a failure occurs on the left-hand side of the node.
Figure 12:
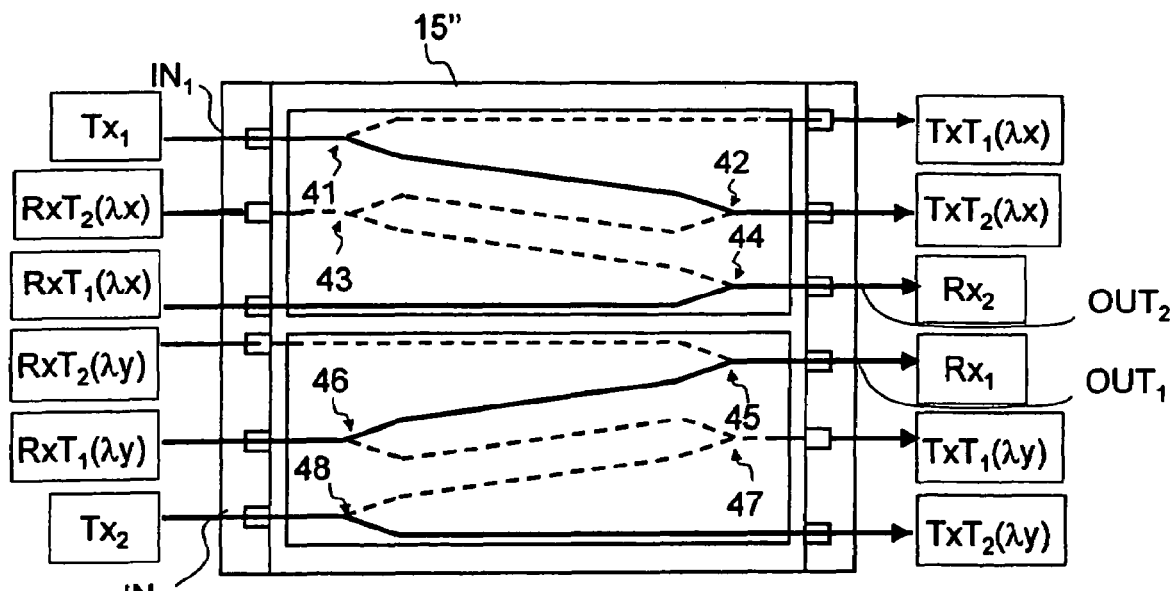
FIG. 12 shows the reconfiguration of the switching unit of FIG. 5 when a failure occurs on the left-hand side of the node.

In the new node configuration, the first transmitter $Tx_1$ is connected to the third transmitting transponder $TxT_2(\lambda_x)$ and the corresponding signals are then sent on the internal ring 3 in clockwise direction, while the first receiver $Rx_1$ is connected to the second receiving transponder $RxT_1(\lambda_y)$ and the signals are then received from the external ring 2 in counter-clockwise direction. If the considered node includes a switch unit 15' (1×2 and 2×1 switches) or a switch unit 15" (integrated optics) in place of switch unit 15 (2×2 switches), the reconfigured status of the corresponding switch unit is as shown in FIG. 11 and, respectively, in FIG. 12.

The node at the other end of the affected link performs the same operations, after receiving a failure message from the other node, or after detecting the absence of signals or a signal quality degradation at its first receiving transponder $RxT_1(\lambda_x)$ The working link between the two nodes is consequently re-routed on the protection path associated to the working link. Both the reconfigured nodes have also to update the signaling information (generated by the respective CPUs and added to the transmitted signals in the respective transmitting transponders TxTs) carried by the protection wavelengths $\lambda_{x,p}, \lambda_{y,p}$ in order to inform all the other nodes on the same logical ring that the shared resource is at present used by the two considered nodes.

When the failure has been repaired, both the nodes at the end of the affected link can be restored to the normal operative condition of FIG. 3, thus releasing the shared protection resource.

In nodes including more than one receiving/transmitting module 6, the described protection mechanism operates independently for each module 6.

Figure 15:
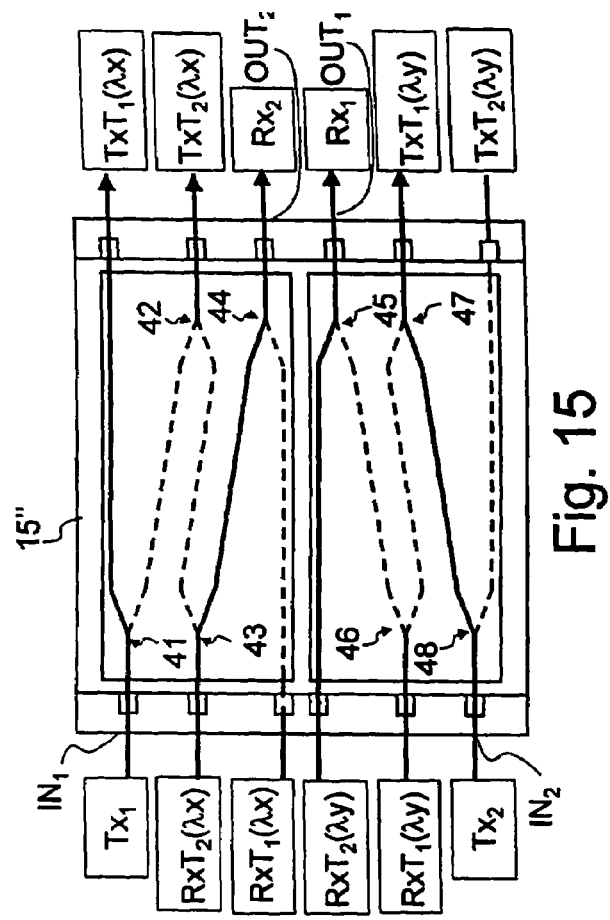
FIG. 15 shows the reconfiguration of the switching unit of FIG. 5 when a failure occurs on the right-hand side of the node.
Figure 14:
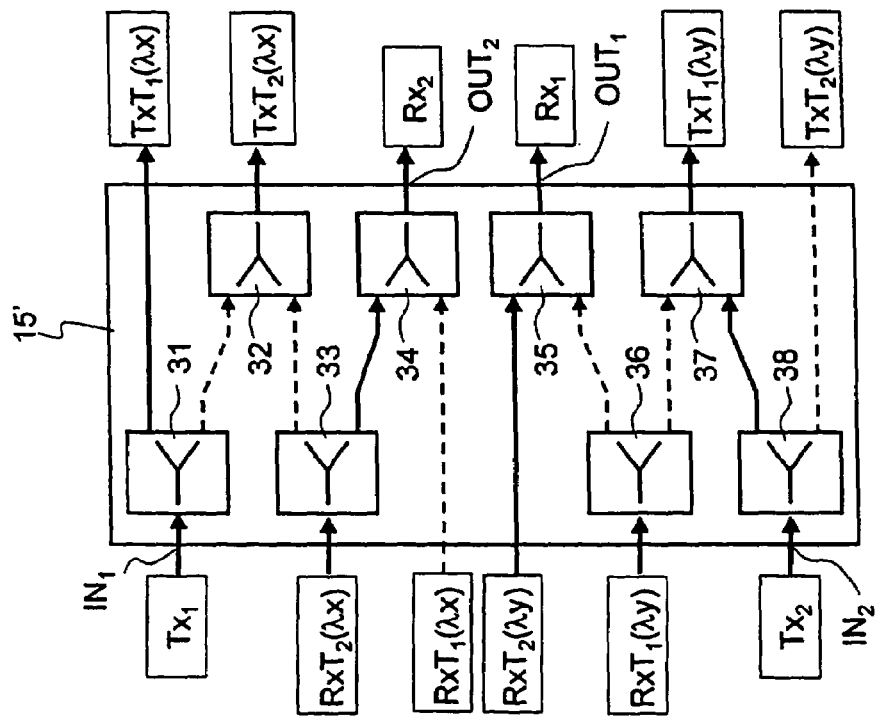
FIG. 14 shows the reconfiguration of the switching unit of FIG. 4 when a failure occurs on the right-hand side of the node.

FIGS. 13–15 depicts the situation in which a failure occurs on the right-hand side of the generic node 20i. The reconfiguration process is very similar to the one referred to the left-hand side failure and is not here described.

It is intended that, without depart from the scope of the present invention, the architecture of the nodes may me arranged so that, in the absence of failures, protection wavelengths $\lambda_{x,p}$ on the internal ring 3 and $\lambda_{y,p}$ on the external ring 2 may be used to transport low-priority in the same direction as the other wavelengths on the same ring.

Figure 16:
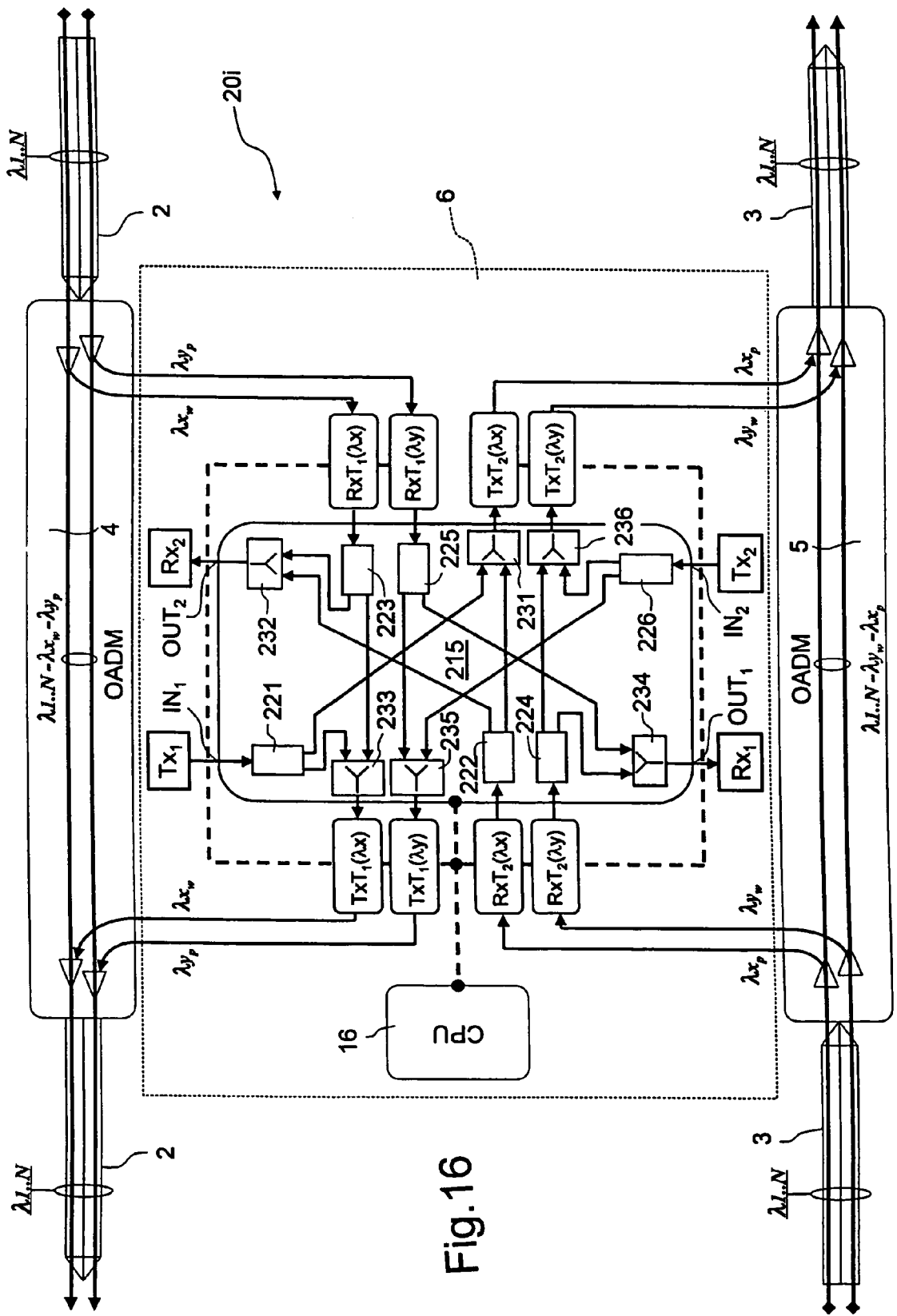
FIG. 16 illustrates an alternative node architecture.

Additional network functionality may be obtained if the ring network includes switch units as depicted in FIG. 16. In detail, FIG. 16 shows a switch unit 215 including:

a first, a second, a third, a fourth, a fifth and a sixth 3-dB splitter 221–226 having the respective inputs coupled to the first transmitter $Tx_1$ (via the first signal input $IN_1$), the third receiving transponder $RxT_2(\lambda_x)$, the first receiving transponder $RxT_1(\lambda_x)$ the fourth receiving transponder $RxT_2(\lambda_y)$ the second receiving transponder $RxT_1(\lambda_y)$ and the second transmitter $Tx_2$ (via the second signal input $IN_2$), respectively;

a first, a second, a third, a fourth, a fifth and a sixth switch 231–236 of the 2×1 type, wherein:

the first switch 231 has a first input coupled to a second output of the first splitter 221, a second input coupled to a first output of the second splitter 222 and an output coupled to the third transmitting transponder $TxT_2(\lambda_x)$;

the second switch 232 has a first input coupled to a second output of the second splitter 222, a second input coupled to a first output of the third splitter 223 and an output coupled to the second receiver $Rx_2$ (via the second signal output $OUT_2$);

the third switch 233 has a first input coupled to a first output of the first splitter 221, a second input coupled to a second output of the third splitter 223 and an output coupled to the first transmitting transponder $TxT_2(\lambda_x)$;

the fourth switch 234 has a first input coupled to a second output of the fourth splitter 224, a second input coupled to a first output of the fifth splitter 225 and an output coupled to the first receiver $Rx_1$ (via the first signal output $OUT_1$);

the fifth switch 235 has a first input coupled to a second output of the fifth splitter 225, a second input coupled to a first output of the sixth. splitter 226 and an output coupled to the second transmitting transponder $TxT_1(\lambda_y)$;

the sixth switch 236 has a first input coupled to a first output of the fourth splitter 224, a second input coupled to a second output of the sixth splitter 226 and an output coupled to the fourth transmitting transponder $TxT_2(\lambda_y)$.

Switches 231–236 may be optomechanical switches, for example of the type produced by JDS FITEL, INC., 570 Heston Drive, Nepean, Ontario (CA) or of the type produced by E-TEK DYNAMICS, INC., 1885 Lundy Ave., San Jose, Calif. (USA). Splitters 221–226 may be of a known type, for example those produced by E-TEK DYNAMICS, INC., 1885 Lundy Ave., San Jose, Calif. (USA). Alternatively, switch unit 215 may be made in integrated optics (preferably in the lithium niobate technology), and its components (switches 231–236 and splitters 221–226) may be realized on a single chip.

Figure 18:
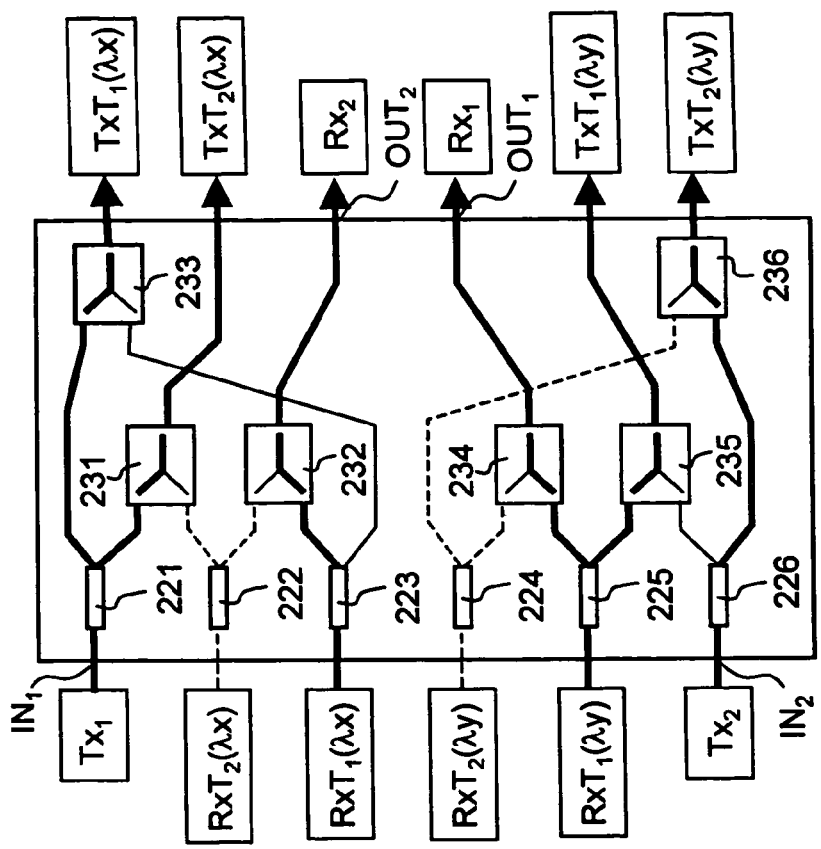
FIG. 18 shows the reconfiguration of the node of FIG. 16 when a failure occurs on its left-hand side.
Figure 17:
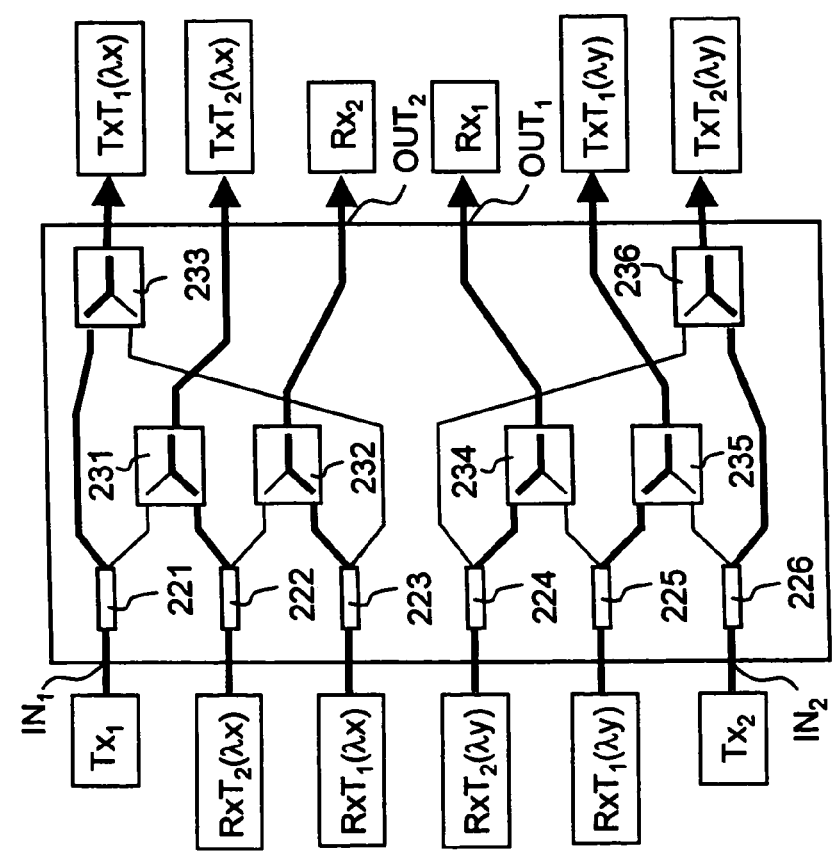
FIG. 17 is a schematic representation of signal routing in the node of FIG. 16 under normal operative conditions.

FIGS. 17 and 18 are schematic representations of signal routing (heavy lines) in the switch unit 215 under normal operative conditions and, respectively, in case of failure on the left-hand side of the considered node. Under normal operative conditions, signals routing among transponders, transmitters and receivers within the nodes is the same as previously described. As a reaction to failure (detected or signaled) on the left-hand side of the node, the first switch 231 is switched so as to couple the third transmitting transponder $TxT_2(\lambda_x)$ to the first transmitter $Tx_1$ (via the first signal input $IN_1$ and the first splitter 221) and the fourth switch 234 is switched so as to couple the first receiver $Rx_1$ (via the first signal output $OUT_1$) to the second receiving transponder $RxT_1(\lambda_y)$ (via the fifth splitter 225). The first transmitter $Tx_1$ is then allowed to transmit signals in both the working channel of the external ring 2 (as before the failure) and the protection channel of the internal ring 3 (in the opposite direction); at the same time, signals received by the second receiving transponder $RxT_1(\lambda_y)$ from the protection channel of the external ring 2 are fed (via the fifth splitter 225, the fourth switch 234 and the fifth switch 235) to both the second transmitting transponder $TxT_1(\lambda_y)$ (as before the failure) and the first receiver $Rx_1$.

The described switching architecture allows the following additional functionality: continuous monitoring of working and protection lines, flexible channel add/drop or node by-pass, multicasting/broadcasting of working and protection channels with "drop & continue" and multi-ring interconnection with "drop & continue".

1) Continuous monitoring of working and protection lines: when a failure occurs, signal transmission in the direction of the failure does not stop; this allows a continuous monitoring of the failure, channels and an immediate re-establishment of the failed communication when the fault is repaired.

2) Flexible Channel Add/Drop: This solution allows flexible optical channel add/drop at node site. By flexible add/drop of an optical channel (i.e. a wavelength) it is intended the ability to configure the network in order to add and/or drop an optical channel in a specific node or let it pass through towards a different destination, without interfering with the protection signal routing. This process can be controlled locally or remotely.

Figure 20:
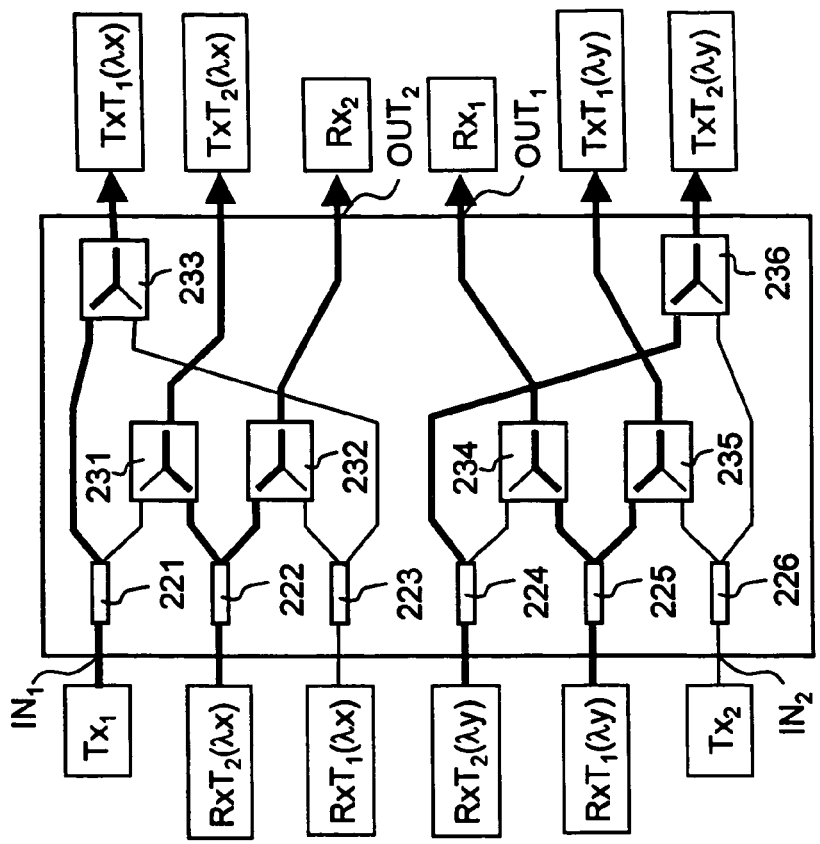
FIG. 20 illustrates schematically signal routing in the node of FIG. 16 when multicasting/broadcasting of protection channels is performed.
Figure 19:
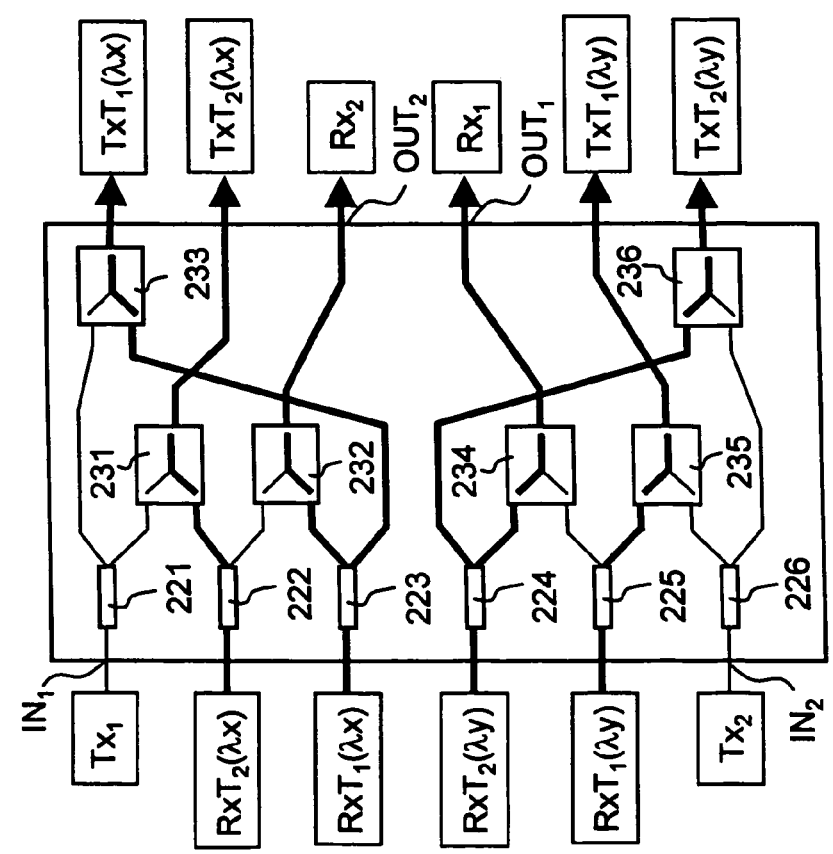
FIG. 19 illustrates schematically signal routing in the node of FIG. 16 when multicasting/broadcasting of working channels is performed.

3) Multicasting/broadcasting of working and protection channels: by choosing the appropriate switching condition of switch unit 215, it is possible to perform, under both normal and failure conditions, a multicasting/broadcasting transmission. Broadcasting is the process of sending a signal or message from one node (or station) of the network to all other nodes of the network, while multicasting is the process of sending a signal or message from one node of the network to a selected subset of all other nodes of the network. Switch unit 215 may be configured so as to allow dropping of an optical channel at the node site and at the same time letting it pass through the node. In this way it is possible to send the same signal from one transmission point to multiple receiver points (i.e. point-to-multi-point connection). For example, multicasting/broadcasting of the working channel ($\lambda_{x,w}$) transmitted onto the external ring 2 is performed, as illustrated in FIG. 19, by operating the second and the third switch 232, 233 so as to couple the first receiving transponder $RxT_1(\lambda_x)$ to both the second receiver $Rx_2$ (via the second signal output $OUT_2$) and the first transmitting transponder $TxT_1(\lambda_x)$ (via the third splitter 223); accordingly, signals on working channel $\lambda_{x,w}$ are both received into the considered node and re-transmitted onto the external ring 2. During broadcast of working channel $\lambda_{x,w}$, the first transmitter $Tx_1$ is operatively disconnected from the first transmitting transponder $TxT_1(\lambda_x)$. Similarly, broadcasting of the working channel $\lambda_{y,w}$ of the internal ring 3 is performed by operating the fourth and the sixth switch 234, 236 so as to couple (via the fourth splitter 224) the fourth receiving transponder $RxT_2(\lambda_y)$ to both the first receiver $Rx_1$ (via the first signal input $IN_1$) and the fourth transmitting transponder $TxT_2(\lambda_y)$; therefore, signals on working channel $\lambda_{y,w}$ are both received into the considered node and re-transmitted onto the internal ring 3. During broadcast of working channel $\lambda_{y,w}$, the second transmitter $Tx_2$ is operatively disconnected from the fourth transmitting transponder $TxT_2(\lambda_y)$. In the same way, as illustrated in FIG. 20, it is possible to perform the broadcasting of the protection channel $\lambda_{x,p}$ by operating the first and the second switch 231, 232 so that the third receiving transponder $RxT_2(\lambda_x)$ is coupled to both the third transmitting transponder $TxT_2(\lambda_x)$ and the second receiver $Rx_2$ and the broadcasting of the protection channels $\lambda_{y,p}$ by operating the fourth and the fifth switch 234, 235 so that the second receiving transponder $RxT_1(\lambda_y)$ is coupled to both the second transmitting transponder $TxT_1(\lambda_y)$ and the first receiver $Rx_1$. During broadcast of protection channel $\lambda_{x,p}$, the first transmitter $Tx_1$ can be operatively connected to the first transmitting transponder $TxT_1(\lambda_x)$ and during broadcast of protection channel $\lambda_{y,p}$, the second transmitter $Tx_2$ can be operatively connected to the fourth transmitting transponder $TxT_2(\lambda_y)$. It is possible to perform the simultaneous broadcast of channels $Ax,w$ and $\lambda_{y,w}$, of channels $\lambda_{x,w}$ and $\lambda_{y,p}$, of channels $\lambda_{y,w}$ and $\lambda_{x,p}$ and of channels $\lambda_{x,p}$ and $\lambda_{y,p}$.

Figure 21:
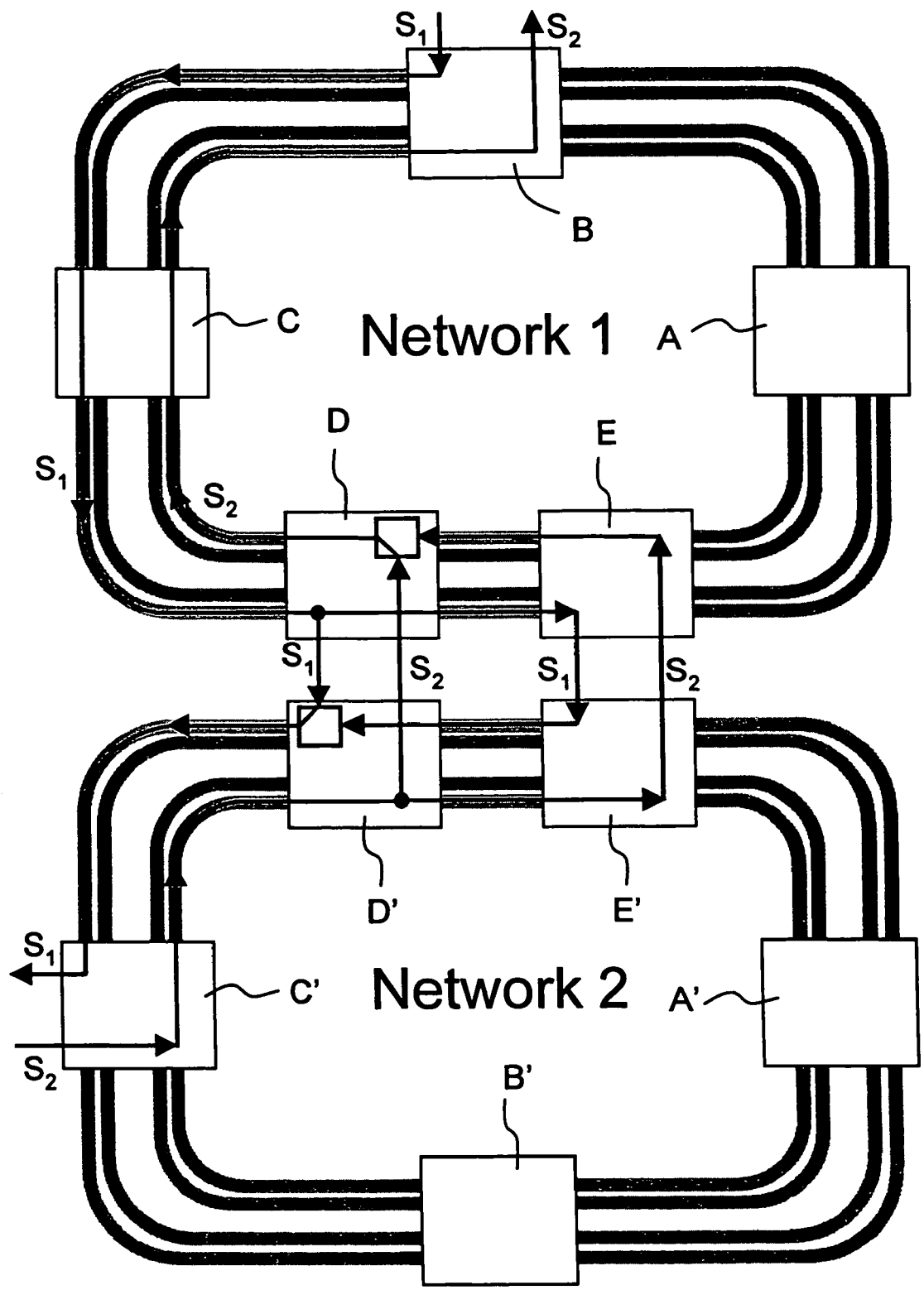
FIGS. 21–24 illustrate signal exchange between two different ring network under normal operative conditions and for different failure conditions.

4) Multi-ring interconnection: two or more different ring networks can exchange signals in the way hereinbelow described. FIG. 21 shows two ring networks, identified as Network 1 and Network 2, each having a plurality of nodes for client communication and a pair of nodes for signal exchange with the other ring network. In particular, Network 1 includes three nodes A, B, C for client communication, and a primary and a secondary node D, E ("gateways") for signal exchange with Network 2. Network 2 includes three nodes A', B', C' for client communication, and a primary and a secondary node D', E' ("gateways") for signal exchange with nodes D and E, respectively. Nodes D, E, D' and E' differ from the other nodes in that in place of transmitters $Tx_1$, $Tx_2$ and receivers $Rx_1$, $Rx_2$ there are optical connections with the corresponding nodes of the other ring network. In detail:

splitter 221 of node D (D') is optically connected to switch 232 of node D' (D);

splitter 226 of node D (D') is optically connected to switch 234 of node D' (D).

Analogous connections are present between nodes E and E'.

In the considered example, a. signal $S_1$ at $\lambda_x$ is transmitted from node B to node C' and a signal $S_2$ at wavelength $\lambda_y$ is transmitted from node C' to node B. Under normal operative conditions, signal S1 is inserted into the first ring network (Network 1) by node B, passes through node C and is received by node D, where it is split into a first and a second fraction (50% of power) which are sent towards nodes E and D'. This functionality is called "drop and continue". Node D' selects signal $S_1$ coming from node D or node E' and transmits it to node C', where it is extracted. In a similar way, signal $S_2$ is transmitted from node C' to node B via nodes D' and D.

In more detail, signal routing within the different nodes during normal operative conditions are the following:

Node B
  Signal $S_1$ is inserted at the first input $IN_1$ and transmitted via the first transmitting transponder $TxT_1(\lambda_x)$.
  Signal $S_2$ is received from the fourth receiving transponder $RxT_2(\lambda_y)$ and extracted at the first output $OUT_1$.

Node C
  Signal $S_1$ is received via the first receiving transponder $RxT_1(\lambda_x)$ and continues via the first transmitting transponder $TxT_1(\lambda_x)$.
  Signal $S_2$ is received via the fourth receiving transponder $RxT_2(\lambda_y)$ and continues via the fourth transmitting transponder $TxT_2(\lambda_y)$.

Node D
  Signal $S_1$ is received via the first receiving transponder $RxT_1(\lambda_x)$ and it is both dropped at the second output $OUT_2$ and continued via the first transmitting transponder $TxT_1(\lambda_x)$.
  Signal $S_2$ is received via both the second input $IN_2$ and the fourth receiving transponder $RxT_2(\lambda_y)$; the sixth switch 236 is operated so as to connect the fourth transmitting transponder $TxT_2(\lambda_y)$ to the second input $IN_2$ under normal operative conditions and to the fourth receiving transponder $RxT_2(\lambda_y)$ when nodes D and D' cannot communicate.

Node E
  Signal $S_1$ is received via the first receiving transponder $RxT_1(\lambda_x)$ and it is dropped at the second output $OUT_2$.
  Signal $S_2$ is received via the second input $IN_2$ and transmitted via the fourth transmitting transponder $TxT_2(\lambda_y)$.

Node D'
  Signal $S_1$ is received via both the first input $IN_1$ and the first receiving transponder $RxT_1(\lambda_x)$; the third switch 233 is operated so as to connect the first transmitting transponder $TxT_1(\lambda_x)$ to the first input $IN_1$ under normal operative conditions and to the first receiving transponder $RxT_1(\lambda_x)$ when a failure avoids correct transmission between nodes D and D'.
  Signal $S_2$ is received from the fourth receiving transponder $RxT_2(\lambda_y)$ and it is both dropped at the first output $OUT_1$ and continued via the fourth transmitting transponder $TxT_2(\lambda_y)$.

Node E'
  Signal $S_1$ is received via the first input $IN_1$ and transmitted via the first transmitting transponder $TxT_1(\lambda_x)$.
  Signal $S_2$ is received via the fourth receiving transponder $RxT_2(\lambda_y)$ and it is dropped at the first output $OUT_1$.

Node C'
  Signal $S_1$ is received via the first receiving transponder $RxT_1(\lambda_x)$ and extracted at the second output $OUT_2$.
  Signal $S_2$ is inserted at the second input $IN_2$ and transmitted via the fourth receiving transponder $TxT_2(\lambda_y)$.

Figure 22:
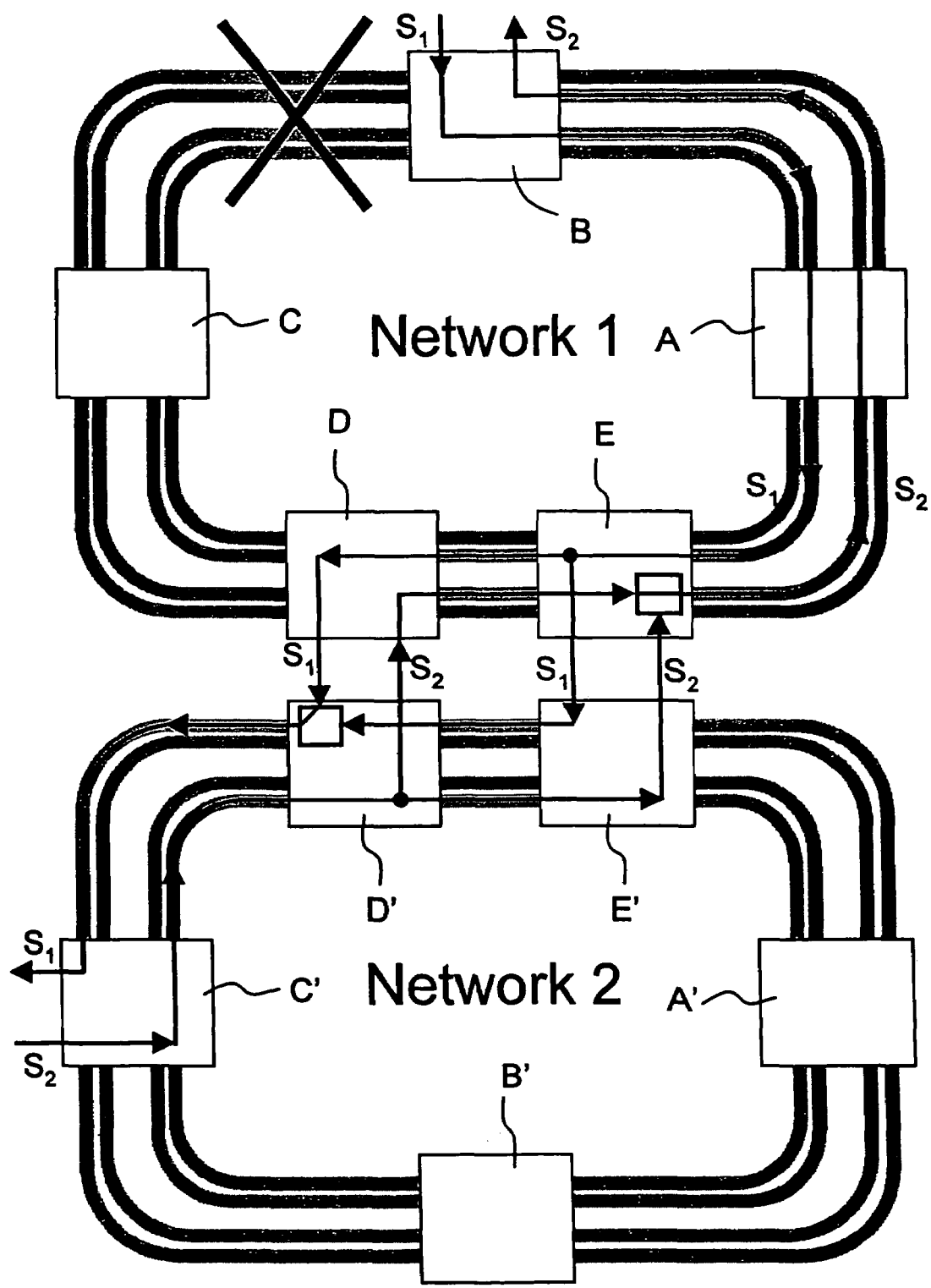

The bi-directional connection. between nodes B and C' is protected against independent failures in Network 1 and Network 2 and also in case of a gateway failure (e.g; in case of failure of nodes D, D', E or E'). When a failure occurs on one of the two rings (or on both), communication is switched onto the protection channels and signals $S_1$ and $S_2$ are still transferred between the two rings by the D–D' (primary nodes) connection. FIG. 22 illustrates a possible failure condition, in which the communication is interrupted between nodes B and C. In this case, signals $S_1$ and $S_2$ are conveyed along the complementary path through node A. In brief, signal $S_1$ is transmitted by node B onto the protection channel $\lambda_{x,p}$ of the internal ring 3, passes through nodes A and E and is received by node D, where the second splitter 222 feeds a fraction of it to the second switch 232, and this last operates so as to transmit signal $S_1$ at $\lambda_{x,p}$ towards node D'. Node D' receives signal $S_1$ at the input of its first splitter 221 and sends it, via its third switch 233 and its first transmitting transponder $TxT_1(\lambda_x)$. to node C', where it is extracted in the same way as above. Analogously, signal $S_2$ is transmitted to node B by exploiting the protection channel $\lambda_{x,p}$ of the external ring.

In more detail, the signal routing within the different nodes during a failure condition as the one illustrated in FIG. 22, is the following:

Node B
  Signal S1 is inserted at the first input $IN_1$ and transmitted via the third transmitting transponder $TxT_2(\lambda_x)$.
  Signal $S_2$ is received via the second receiving transponder $RxT_1(\lambda_y)$ and extracted at the first output $OUT_1$.

Node A
  Signal $S_1$ is received via the third receiving transponder $RxT_2(\lambda_x)$ and it is transmitted via the third transmitting transponder $TxT_2(\lambda_x)$.
  Signal $S_2$ is received via the second receiving transponder $RxT_1(\lambda_y)$ and transmitted via the second transmitting transponder $TxT_1(\lambda_y)$.

Node E
  Signal $S_1$ is received via the third receiving transponder $RxT_2(\lambda_x)$ and it is both dropped at the second output $OUT_2$ and transmitted via the third transmitting transponder $TxT_2(\lambda_x)$.
  Signal $S_2$ is received via both the second input $IN_2$ and the second transmitting transponder $RxT_1(\lambda_y)$: the fifth switch 235 is operated so as to connect the second transmitting transponder $TxT_1(\lambda_y)$ to either the second input $IN_2$ or the second transmitting transponder $RxT_1(\lambda_y)$.

Node D'
  Signal $S_1$ is received via both the first input $IN_1$ and the first receiving transponder $RxT_1(\lambda_x)$: the third switch 233 is operated so as to connect the first transmitting transponder $TxT_1(\lambda_x)$ to either the first input $IN_1$ and the first receiving transponder $RxT_1(\lambda_x)$.
  Signal $S_2$ is received via the fourth receiving transponder $RxT_2(\lambda_y)$ and it is both dropped at the first output $OUT_1$ and transmitted via the fourth transmitting transponder $TxT_2(\lambda_y)$.

Node E'
  Signal $S_1$ is received from the first input $IN_1$ and transmitted via the first transmitting transponder $TxT_2(\lambda_y)$.
  Signal $S_2$ is received via the fourth receiving transponder $RxT_2(\lambda_y)$ and dropped at the first output $OUT_1$.

Node C'
  Signal $S_1$ is received via the first receiving transponder $RxT_1(\lambda_x)$ and extracted at the second output $OUT_2$.
  Signal $S_2$ is inserted at the second input $IN_2$ and transmitted via the fourth transmitting transponder $TxT_2(\lambda_y)$.

In case of failure of gateway node D, communication between nodes B and C' and, in general, between Network 1 and Network 2, can be guaranteed by the optical connection between the secondary nodes E and E'. In fact, when the said failure is detected, the switch units 215 of nodes E and E' are operated so as to perform the required routing operations (i.e. the same routing operations previously performed by nodes D and D'). Networks signal exchange via nodes E and E' continues until communication between nodes D and D' is restored.

Figure 23:
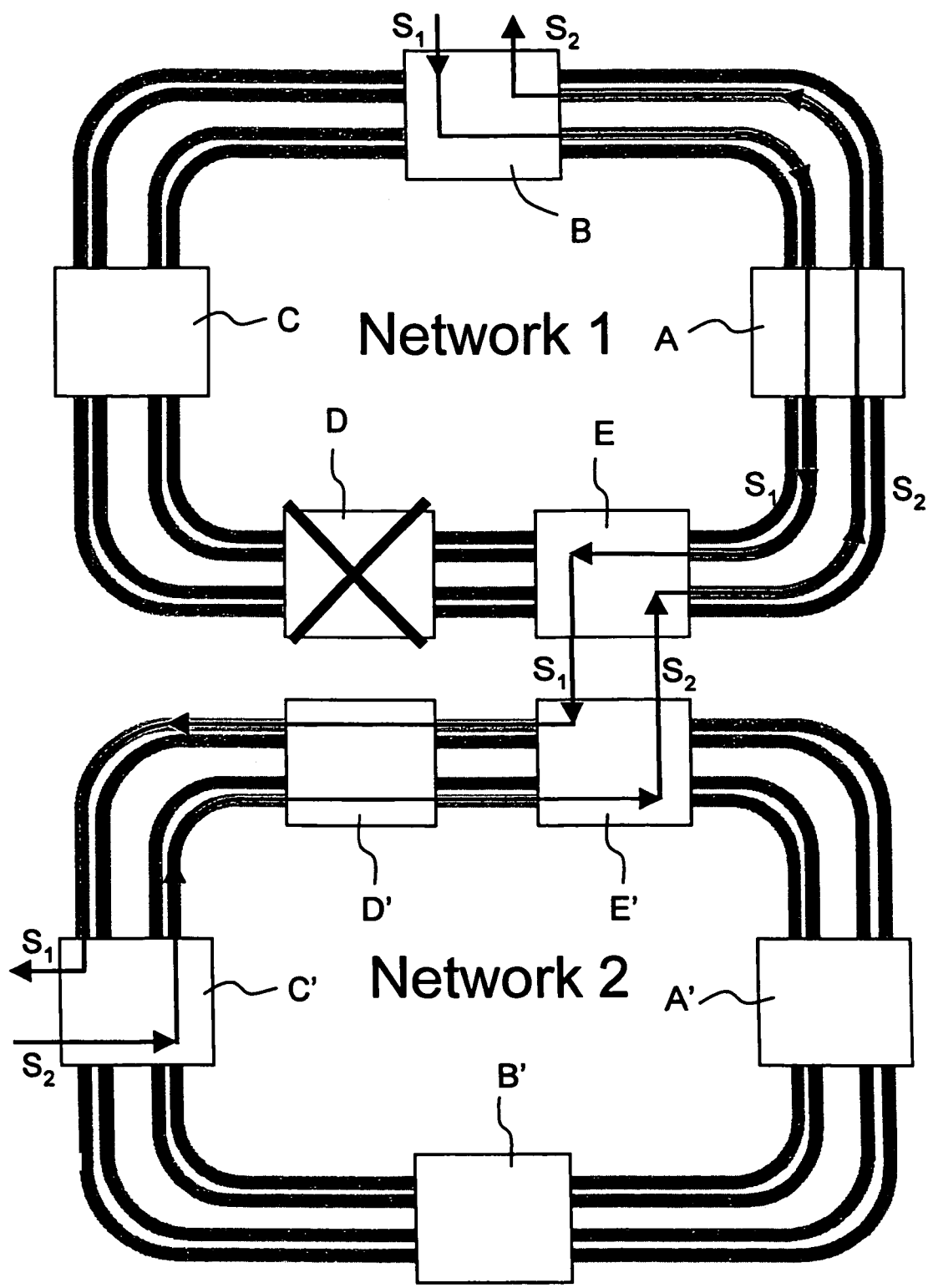

In detail, signal routing when a failure occurs in node D is as hereinbelow described with reference to FIG. 23:

Node B
Signal $S_1$ is inserted at the first input $IN_1$ and transmitted via the third transmitting transponder $TxT_2(\lambda_y)$.
Signal $S_2$ is received via the second transmitting transponder $RxT_1(\lambda_y)$ and extracted at the first output $OUT_1$.

Node A
Signal $S_1$ is received via the third receiving transponder $RxT_2(\lambda_x)$ and it is transmitted via the third transmitting transponder $TxT_2(\lambda_x)$.
Signal $S_2$ is received via the second receiving transponder $RxT_1(\lambda_y)$ and transmitted via the second transmitting transponder $TxT_1(\lambda_y)$.

Node D
Not used (because of failure)

Node E
Signal $S_1$ is received via the third receiving transponder $RxT_2(\lambda_x)$ and dropped at the second output $OUT_2$.
Signal $S_2$ is received via the second input $IN_2$ only; the fifth switch 235 is operated so as to connect the second transmitting transponder $TxT_1(\lambda_y)$ to the second input $IN_2$.

Node D'
Signal $S_1$ is received via the first transmitting transponder $RxT_1(\lambda_x)$ only; the third switch 233 is operated so as to connect the first transmitting transponder $TxT_1(\lambda_x)$ to the first transmitting transponder $RxT_1(x)$.
Signal $S_2$ is received via the fourth receiving transponder $RxT_2(\lambda_y)$ and transmitted via the fourth transmitting transponder $TxT_2(\lambda_y)$.

Node E'
Signal $S_1$ is received via the first input $IN_1$ and transmitted via the first transmitting transponder $TxT_1(\lambda_x)$.
Signal $S_2$ is received via the fourth receiving transponder $RxT_2(\lambda_y)$ and it is dropped at the first output $OUT_1$.

Node C'
Signal $S_1$ is received via the first receiving transponder $RxT_1(\lambda_x)$ and extracted at the second output $OUT_2$.
Signal $S_2$ is inserted at the second input $IN_2$ and transmitted via the fourth transmitting transponder $TxT_2(\lambda_y)$.

Figure 24:
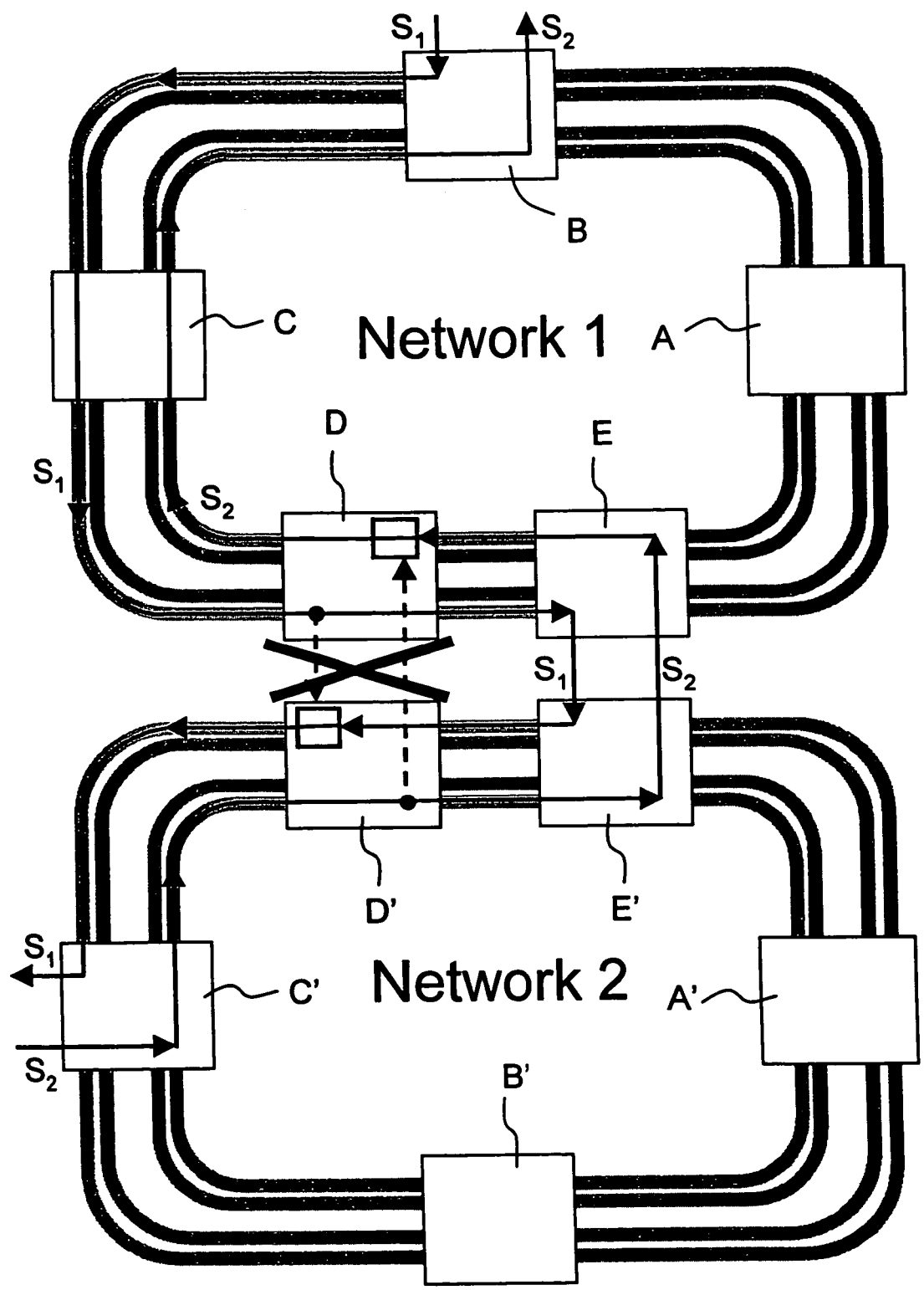

Communication between nodes B and C' and, in general, between Network 1 and Network 2, can be guaranteed by the optical connection between the secondary nodes E and E' even in case of failure on the D–D' optical connection, as illustrated in FIG. 24. In fact, when such a failure is detected, switch units 215 of nodes E and E' are operated so as to perform the required routing operations. Rings signal exchange via nodes E and E' continues until communication between nodes D and D' is restored.

In detail, signal routing in the different nodes during a connection failure between nodes D and D' is as follows:

Node B
Signal $S_1$ is inserted at the first input $IN_1$ and transmitted via the first transmitting transponder $TxT_1(\lambda_x)$.
Signal $S_2$ is received via the fourth receiving transponder $RxT_2(\lambda_y)$ and extracted at the first output $OUT_1$.

Node C
Signal $S_1$ is received via the first receiving transponder $RxT_1(\lambda_x)$ and continues via the first transmitting transponder $TxT_1(\lambda_x)$.
Signal $S_2$ is received via the fourth receiving transponder $RxT_2(\lambda_x)$ and continues via the fourth transmitting transponder $TxT_2(\lambda_x)$.

Node D
Signal $S_1$ is received via the first receiving transponder $RxT_1(\lambda_x)$ and it is both dropped at the second output $OUT_2$ and transmitted via the first transmitting transponder $TxT_1(\lambda_x)$.
Signal $S_2$ is received via the fourth receiving transponder $RxT_2(\lambda_y)$ only: the first switch 231 is operated so as to connect the fourth transmitting transponder $TxT_2(\lambda_y)$ to the fourth receiving transponder $RxT_2(\lambda_y)$.

Node E
Signal $S_1$ is received via the first receiving transponder $RxT_1(\lambda_x)$ and dropped at the second output $OUT_2$.
Signal $S_2$ is received via the second input $IN_2$ and transmitted via the fourth transmitting transponder $TxT_2(\lambda_y)$.

Node D'
Signal $S_1$ is received via the first receiving transponder $RxT_1(\lambda_x)$ only: the third switch 233 is operated so as to connect the first transmitting transponder $TxT_1(\lambda_x)$ to the first receiving transponder $RxT_1(\lambda_x)$.
Signal $S_2$ is received via the fourth receiving transponder $RxT_2(\lambda_y)$ and it is both dropped at the first output $OUT_1$ and transmitted via the fourth transmitting transponder $TxT_2(\lambda_y)$.

Node E'
Signal $S_1$ is received via the first input $IN_1$ and transmitted via the first transmitting transponder $TxT_1(\lambda_x)$.
Signal $S_2$ is received via the fourth receiving transponder $RxT_2(\lambda_y)$ and dropped at the first output $OUT_1$.

Node C'
Signal $S_1$ is received via the first receiving transponder $RxT_1(\lambda_x)$ and extracted at the second output $OUT_2$.
Signal $S_2$ is inserted at the second input $IN_2$ and transmitted via the fourth transmitting transponder $TxT_2(\lambda_y)$.

The invention claimed is:

1. An apparatus, comprising:
a first ring network having a first optical carrier; and
a second ring network having a second optical carrier, the first and second ring networks including:
a pair of nodes that comprise a first and a second node, the pair being coupled along the first and second optical carriers and being operable to manage a subset of wavelengths within a set of transmission wavelengths, the set of transmission wavelengths including more than one transmission wavelength such that one of the transmission wavelengths can be switched while other transmission wavelengths in the set are not switched, a selected one of the set of transmission wavelengths may be reserved on the first optical carrier during a normal operative condition and during a failure the selected wavelength is implemented on the first optical carrier, wherein the first and second nodes are further operable to communicate with each other and to communicate along a working path under the normal operative condition, the first and second nodes being further operable to communicate with each other along a protection path during the failure within a selected one of the first and second ring networks such that one or more optical signals are rerouted along the protection path during the failure, and wherein a response to a failure condition is executed on a channel level, wherein each of the first and second nodes includes a plurality of transmitting and receiving transponders including:
a first transmitting transponder optically coupled to the first optical carrier,
a second transmitting transponder optically coupled to the first optical carrier, and
a third transmitting transponder optically coupled to the second optical carrier, the plurality of receiving transponders including:
a first receiving transponder optically coupled to the second optical carrier,
a second receiving transponder optically coupled to the second optical carrier, and a third receiving transponder optically coupled to the first optical carrier, and wherein, under the normal condition, optical switches in an optical switch are configured to optically connect an optical transmitter to the first transmitting transponder,
to optically connect the first receiving transponder to the third transmitting transponder,
to optically connect the second receiving transponder to an optical receiver, and
to optically connect the third receiving transponder to the second transmitting transponder;
the first and second ring networks also including a first primary gateway node and a first secondary gateway node, the first primary gateway node and the first secondary gateway node being coupled along the first and second optical carriers;
a third ring network having a third optical carrier;
a fourth ring network having a fourth optical carrier, the third and fourth ring networks including:
a second primary gateway node and a second secondary gateway node, the second primary gateway node and a second secondary gateway node being coupled along the third and fourth optical carriers;
wherein the primary gateway nodes exchange signals with each other through a first set of optical connections that are separate from the first, second, third, and fourth carriers;
wherein the secondary gateway nodes exchange signals with each other through a second set of optical connections that are separate from the first, second, third, and fourth carriers; and
wherein the gateway nodes have a drop and continue functionality.

2. The apparatus of claim 1, wherein the first and second ring networks are operable to propagate one or more optical signals in one or more transmission channels included therein, the one or more transmission channels being defined by a set of wavelengths having a predetermined wavelength transmission band.

3. The apparatus of claim 1, wherein the pair of nodes are operable to communicate optical data at first and second wavelengths.

4. The apparatus of claim 3, wherein the working path utilizes the first wavelength for optical data propagation on the first ring network and the second wavelength for optical data propagation on the second ring network.

5. The apparatus of claim 4, wherein the first wavelength is not used during a selected time interval on the second ring network for optical data propagation and the second wavelength is not used during a selected time interval on the first ring network for optical data propagation.

6. The apparatus of claim 4, wherein the pair of nodes are operable to communicate optical data at a pair of generic wavelengths that define a logical ring that may include the working path that utilizes the first wavelength on the first ring network and the second wavelength on the second ring network.

7. The apparatus of claim 3, wherein the protection path utilizes the first and second wavelengths to communicate optical data.

8. The apparatus of claim 1, wherein the first and second nodes are operable to perform add/drop/bypass operations for one or more optical signals propagating along a selected one of the first and second ring networks.

9. The apparatus of claim 1, wherein the first and second nodes are operable to perform an amplification operation for one or more optical signals propagating along a selected one of the first and second ring networks.

10. The apparatus of claim 1, wherein the first and second nodes are operable to perform a regeneration operation for one or more optical signals propagating along a selected one of the first and second ring networks.

11. The apparatus of claim 1, wherein the first and second ring networks define an optical transmission system that includes inner and outer ring networks that are operable to facilitate propagation of optical data in opposite directions.

* * * * *